US010183689B2

(12) United States Patent
Matsuno et al.

(10) Patent No.: US 10,183,689 B2
(45) Date of Patent: Jan. 22, 2019

(54) STEERING COLUMN APPARATUS

(71) Applicant: FUJI KIKO CO., LTD., Kosai-shi, Shizuoka (JP)

(72) Inventors: Mitsuyoshi Matsuno, Kosai (JP); Koji Sawamura, Kosai (JP); So Tanaka, Kosai (JP); Tadao Ito, Toyohashi (JP); Aya Shimada, Hamamatsu (JP); Masatoshi Sakamoto, Toyohashi (JP); Reo Katakura, Hamamatsu (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 58 days.

(21) Appl. No.: 15/296,504

(22) Filed: Oct. 18, 2016

(65) Prior Publication Data
US 2017/0113710 A1   Apr. 27, 2017

(30) Foreign Application Priority Data

Oct. 23, 2015  (JP) ................................. 2015-208495
Mar. 31, 2016  (JP) ................................. 2016-072580

(51) Int. Cl.
*B62D 1/19* (2006.01)
*B62D 1/187* (2006.01)

(52) U.S. Cl.
CPC ............ *B62D 1/187* (2013.01); *B62D 1/192* (2013.01); *B62D 1/195* (2013.01)

(58) Field of Classification Search
CPC .......... B62D 1/19; B62D 1/192; B62D 1/195; B62D 1/197; F16F 7/12; F16F 7/123; F16F 7/128

USPC ........................................................ 280/777
See application file for complete search history.

(56) References Cited

U.S. PATENT DOCUMENTS

| 5,961,146 | A | 10/1999 | Matsumoto et al. |
| 2007/0108754 | A1* | 5/2007 | Eggers ................. B62D 1/195 280/777 |
| 2009/0218801 | A1 | 9/2009 | Park |
| 2012/0080874 | A1* | 4/2012 | Narita .................. B62D 1/184 280/777 |
| 2014/0053677 | A1* | 2/2014 | Sakata ................. B62D 1/195 74/493 |

FOREIGN PATENT DOCUMENTS

| EP | 1495940 A1 * | 1/2005 | ............. B62D 1/195 |
| EP | 2910452 A2 * | 8/2015 | ............. B62D 1/195 |
| GB | 2344078 A  * | 5/2000 | ............. B62D 1/195 |
| JP | 9-272448 A | 10/1997 | |
| JP | 2001-058573 A | 3/2001 | |

(Continued)

*Primary Examiner* — Keith J Frisby
(74) *Attorney, Agent, or Firm* — Foley & Lardner LLP

(57) ABSTRACT

Disclosed is a steering column apparatus including an impact energy absorbing mechanism for absorbing an impact energy at a secondary collision. The impact energy absorbing mechanism includes an energy absorbing section that serves as a load generating section for absorbing the impact energy. The energy absorbing section includes (a) a resistive member that extends along an axial direction of the middle jacket and is fixed to the middle jacket and (b) a wire having a bent portion that is wound around the resistive member to have a curvature and a front portion that is fixed to the upper jacket, the front portion being at a more forward position than the bent portion.

8 Claims, 18 Drawing Sheets

(56) References Cited

FOREIGN PATENT DOCUMENTS

| | | | | |
|---|---|---|---|---|
| JP | 2001260900 A | * | 9/2001 | |
| JP | 2005-219641 A | | 8/2005 | |
| JP | 2006-036077 A | | 2/2006 | |
| JP | 2006199180 A | * | 8/2006 | |
| JP | 2007230561 A | * | 9/2007 | |
| JP | 2008-114837 | | 5/2008 | |
| JP | 2008302752 A | * | 12/2008 | |
| JP | 2009196581 A | * | 9/2009 | |
| JP | 2010012980 A | * | 1/2010 | |
| JP | 2010083436 A | * | 4/2010 | |
| KR | 100553962 B1 | * | 2/2006 | ............. B62D 1/195 |
| KR | 100812240 B1 | * | 3/2008 | |
| KR | 20080068333 A | * | 7/2008 | ............. B62D 1/195 |

* cited by examiner

STEERING COLUMN APPARATUS

BACKGROUND OF THE INVENTION

The present invention relates to a steering column apparatus to be installed in a motor vehicle and particularly to a steering column apparatus equipped with a tilt position adjusting function for adjusting the position of the steering wheel and an impact energy absorbing mechanism at a secondary collision by the driver against the steering wheel.

US Patent Application Publication No. 2009/0218801 discloses such a steering column apparatus equipped with a tilt position adjusting function for adjusting the position of the steering wheel in the upward and downward directions and an impact energy absorbing mechanism at a secondary collision by the driver against the steering wheel.

This steering column apparatus is equipped with (a) a tilt jacket that is fixed to a vehicle attachment bracket through a tilt shaft to be adjustable in the upward and downward directions, (b) an upper jacket fixed to the tilt jacket to be compressible in the axial direction, and (c) an energy absorbing mechanism provided between the tilt jacket and the upper jacket. The upper jacket is moved in the axial direction relative to the tilt jacket in order to absorb the impact energy at the collision.

In this steering column apparatus, shaped wires are used as members for conducting energy absorption. Each wire is generally U-shaped. Bent base portion of the wire is engaged with an end surface of the tilt jacket. A free end of the wire, opposite to the bent base portion, is inserted into a hole of a distance bracket of the upper jacket.

Japanese Patent Application Publication 2005-219641 discloses a steering column apparatus using a wire 71 as an impact energy absorbing member at the secondary collision. The wire 71 is provided between a tilt bracket 3 supporting a column 4 and a vehicle body attachment bracket 2 and is folded at a center base portion into two halves. The wire 71 is fixed at the center base portion to a single bolt 62 provided on the side of the tilt bracket 3 and is wound around a pair of drawing bolts 72, 73 at its two portions toward its ends. The bolt 62 is guided into a guide groove 61. At the secondary collision, when the tilt bracket 3 together with the column 4 is detached from the vehicle body attachment bracket 2 and is moved forward, the bolt 62 is also moved forward to draw the wire 71. During this drawing, the wire 71 is continuously subjected to a plastic deformation (bending) at the drawing bolts 72, 73 to absorb impact energy of the secondary collision.

SUMMARY OF THE INVENTION

In the steering column apparatus of US Patent Application Publication No. 2009/0218801, a load itself necessary for drawing the wire from the hole is relatively large. With this, the energy absorbing performance may be unstable. Furthermore, it is necessary to attach the wires for the energy absorption at the same time when inserting the tilt jacket and the upper jacket. This may lower the assembly efficiency of the steering column apparatus.

In the steering column apparatus of Japanese Patent Application Publication 2005-219641, when the tilt bracket 3 is detached from the vehicle body attachment bracket 2 and is moved forward, the tilt bracket 3 is supported by only the bolt 62. With this, the tilt bracket 2 may be twisted or deformed with respect to the vehicle body attachment bracket. This may interfere with the straight movement of the column, thereby damaging a stable energy absorption.

It is therefore an object of the present invention to provide a steering column apparatus with a simple structure, a superior assembly efficiency, and a stable energy absorption.

It is therefore another object of the present invention to provide a steering column apparatus capable of conducting a stable energy absorption by a structure having a small occupied space.

According to the present invention, there is provided a first steering column apparatus including (a) an inverse U-shaped attachment bracket to be fixed to a vehicle body; (b) a U-shaped lower jacket that is arranged in an inside of the attachment bracket and is supported by the attachment bracket; (c) a polygonal rod-shaped middle jacket that is arranged in an inside of the lower jacket and is supported by the lower jacket; (d) an upper jacket that has a polygonal rod shape similar to that of the middle jacket and is slidably inserted and supported in the middle jacket; and (e) an impact energy absorbing mechanism for absorbing an impact energy at a secondary collision. The impact energy absorbing mechanism includes an energy absorbing section that serves as a load generating section for absorbing the impact energy. The energy absorbing section includes (a) a resistive member that extends along an axial direction of the middle jacket and is fixed to the middle jacket and (b) a wire having a bent portion that is wound around the resistive member to have a curvature and a front portion that is fixed to the upper jacket, the front portion being at a more forward position than the bent portion.

In the first steering column apparatus, the wire is wound around the resistive member, which is fixed to the polygonal rod-shaped middle jacket. Energy absorption is conducted by drawing the wire through the sliding movement of the polygonal rod-shaped upper jacket relative to the middle jacket. Therefore, the movable portion is not deformed. Although it is a structure having a small occupied space, it is possible to stably conduct energy absorption at the secondary collision, thereby improving energy absorption characteristic.

In the first steering column apparatus, both of the middle jacket and the upper jacket are polygonal rod-shaped. Furthermore, the middle jacket having the upper jacket inserted therein is covered and supported by a box-shape structure of the inverse U-shaped attachment bracket and the U-shaped lower jacket. Therefore, the first steering column apparatus as a whole becomes high in stiffness (i.e., support stiffness and bending stiffness) and extremely superior in strength. This also contributes to the stabilization of energy absorption characteristic at the secondary collision.

The first steering column apparatus may be a second steering column apparatus wherein the impact energy absorbing mechanism is provided between the middle jacket and the upper jacket and absorbs the impact energy when the upper jacket is moved in the axial direction relative to the middle jacket.

In the second steering column apparatus, the resistive member is a guide member having a center hole, first and second side holes arranged at both sides of the center hole, a first arcuate guide surface positioned between the center hole and the first side hole, and a second arcuate guide surface positioned between the center hole and the second side hole.

In the second steering column apparatus, the impact energy absorbing mechanism further includes an engaging portion provided at the upper jacket.

In the second steering column apparatus, the wire is plastically deformable, is engaged with the engaging portion and is generally W-shaped, thereby having an inverse U-shaped, center portion having first and second center legs extending from a base bent portion, a first side leg extending toward a first side of the base bent portion from a first curved bent portion connecting the first side leg and the first center leg with each other, and a second side leg extending toward a second side of the base bent portion from a second curved bent portion connecting the second side leg and the second center leg with each other.

In the second steering column apparatus, the wire is engaged with the guide member such that the inverse U-shaped, center portion of the wire is received in the center hole of the guide member, that the first and second side legs of the wire are respectively received in the first and second side holes of the guide member, and that the first and second curved bent portions of the wire are respectively fitted onto the first and second arcuate guide surfaces of the guide member.

In the second steering column apparatus, it is possible to engage the wire with the guide member by inserting the wire into the guide member. This engagement can be conducted after installing the tilt jacket and the upper jacket. Thus, the second steering column apparatus is simple in structure and superior in assembly efficiency. The guide member can be small in size. With this, the energy absorption performance also becomes stable.

The second steering column apparatus may be a third steering column apparatus wherein the guide member is generally rectangular in shape in plan view, thereby having short and long sides, wherein the center hole and the first and second side holes are formed through the guide member in a direction along the short side of the guide member, and wherein the guide member is fixed to the middle jacket by first and second screw members passing through open holes formed through the guide member in a direction along a thickness of the guide member.

In the third steering column apparatus, the guide member can be small in size and thin in thickness. With this, the energy absorbing mechanism including the guide member and the energy absorbing wire can be compact in size, thereby improving the design flexibility of the energy absorbing mechanism.

The third steering column apparatus may be a fourth steering column apparatus wherein the middle jacket has a distance portion that is sandwiched between side wall portions of the vehicle body attachment bracket, wherein a clamp shaft of a lock mechanism for locking and unlocking a tilt position of the steering column apparatus passes through the side wall portions of the vehicle body attachment bracket and the distance portion, wherein the impact energy absorbing mechanism is arranged between the middle jacket and the clamp shaft of the lock mechanism, wherein the guide member is fixed to an outer surface of the middle jacket by the first and second screw members, and wherein the engaging portion is provided at the upper jacket and is engaged with the base bent portion of the wire.

In the fourth steering column apparatus, the engaging portion is engaged with the base bent portion of the guide member. Thus, the energy absorbing mechanism is further improved in assembly efficiency.

The first steering column apparatus may be a fifth steering column apparatus wherein the middle jacket includes a polygonal rod-shaped jacket body and an inverse U-shaped distance bracket that is fixed to an upper part of the jacket body, such that the energy absorbing section of the impact energy absorbing mechanism is received in a space defined in an inside of the distance bracket. This allows accommodating the steering column apparatus in a small space.

The fifth steering column apparatus may be a sixth steering column apparatus wherein there is provided a telescopic adjustment mechanism of the upper jacket relative to the middle jacket, wherein the attachment bracket is equipped with a locking mechanism having an operation shaft for locking and unlocking the telescopic adjustment mechanism, wherein the operation shaft of the locking mechanism passes through an elongate hole of the distance bracket and an elongate hole of the resistive member, wherein the wire has upper and lower portions respectively extending above and below the operation shaft, and wherein the resistive member is formed at a rear end thereof with a guide groove for receiving therein the bent portion of the wire. Such guide groove makes it possible to suppress deformation of the wire while the wire is drawn. Thus, it becomes possible to more stably conduct energy absorption.

The sixth steering column apparatus may be a seventh steering column apparatus wherein the resistive member is formed at a front end portion thereof with an engaging guide portion to be engaged with a free end portion of the wire. This makes it possible to still more stably conduct energy absorption.

The seventh steering column apparatus may be an eighth steering column apparatus wherein the wire is folded at the front portion into two halves and is wound around the resistive member at the bent portion. With this, energy absorption can be conducted by using the wire having the minimum length with the minimum stroke.

DETAILED DESCRIPTION

With reference to FIGS. 1 to 10B, a steering column apparatus according to the first embodiment of the present invention, which corresponds to the above-mentioned first to fourth steering column apparatuses, is explained in detail as follows. This steering column apparatus is capable of conducting a tilt operation of the steering wheel in upward and downward directions and a telescopic operation of the steering wheel in forward and rearward directions. These directions and others are defined with reference to the steering column apparatus installed in a motor vehicle. For example, the forward direction refers to the front side of the motor vehicle.

Figure 1:
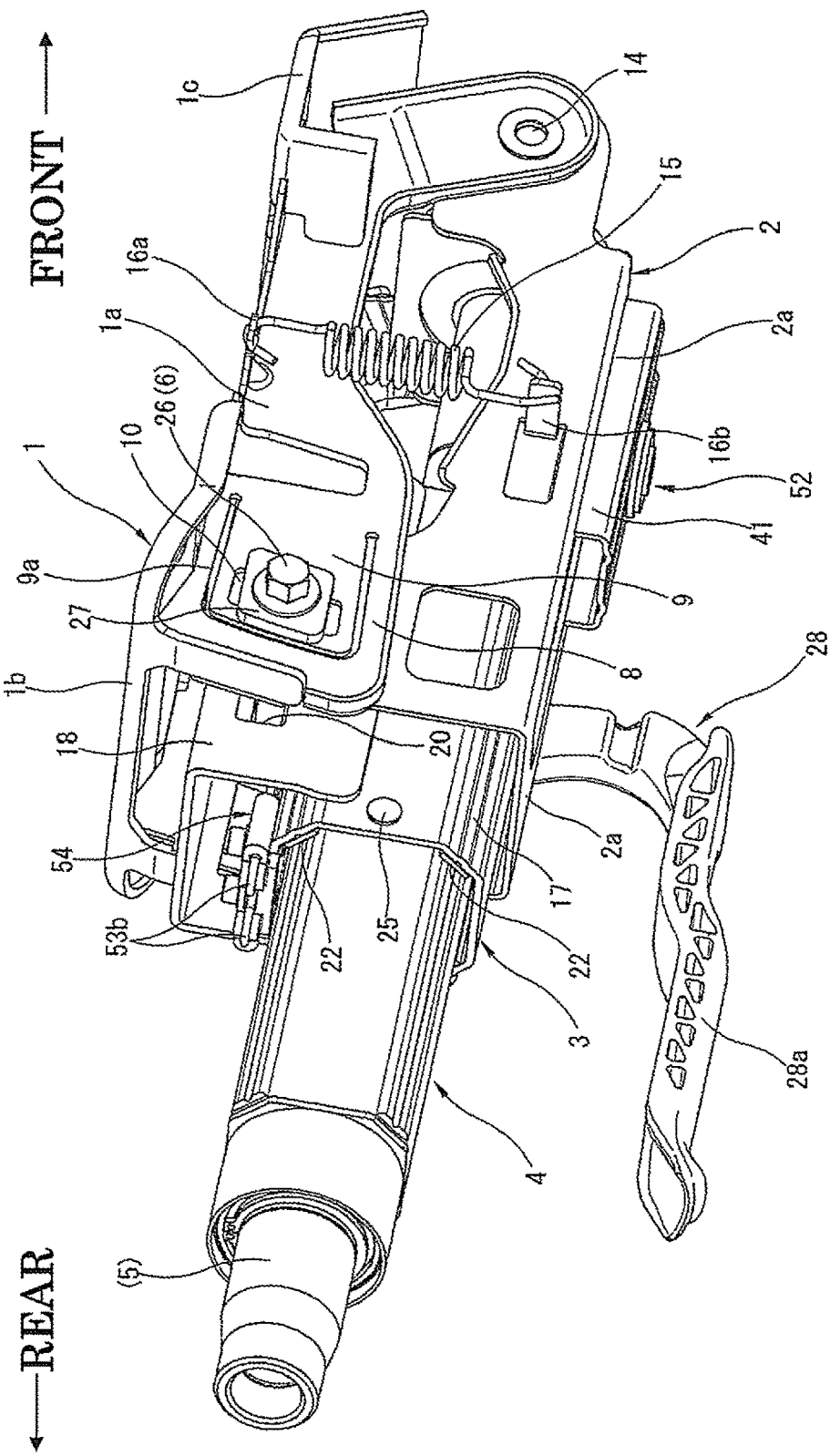
FIG. 1 is a perspective view showing a steering column apparatus according to a first embodiment of the present invention.
Figure 2:
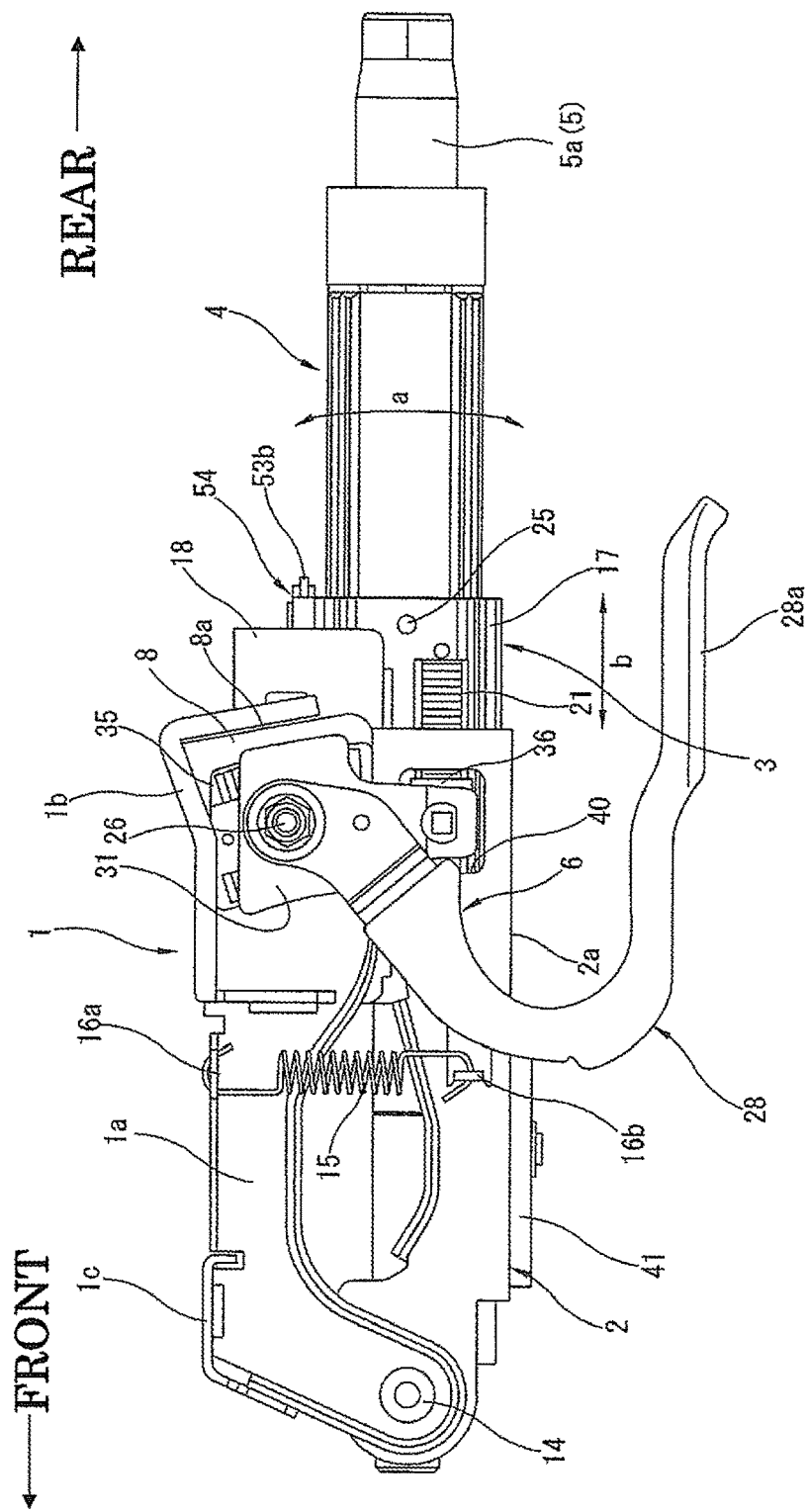
FIG. 2 is a left side view showing the steering column apparatus of FIG. 1.

As shown in FIGS. 1 and 2, the steering column apparatus is mainly equipped with (a) a vehicle body attachment bracket 1 (hereinafter simply referred to as "attachment bracket") that serves as a member for attachment to a vehicle body (not shown in the drawings), (b) a tilt bracket (lower bracket) 2 that is supported by the attachment bracket 1 to be capable of a swing or tilt operation relative to the attachment bracket 1 in upward and downward directions (the directions of arrows "a" in FIG. 2) about a tilt hinge pin 14 as a swing center (tilt shaft) at the front end side, (c) a middle jacket 3 that is supported by the tilt bracket 2 to be capable of a front-back movement or telescopic position adjustment (see the directions of arrows "b" in FIG. 2) relative to the tilt bracket 2, (d) an upper jacket 4 that is inserted and supported in the middle jacket 3 to be capable of a relative sliding movement in an axial direction, (e) a steering shaft 5 that is inserted and rotatably supported in the upper jacket 4, and (f) a locking mechanism for locking or clamping and unlocking or unclamping the attachment bracket 1, the tilt bracket 2 and the middle jacket 3 relative to each other in the tilt position adjustment and the telescopic position adjustment of the steering wheel. The steering wheel is connected at its boss portion with the rear end portion of the steering shaft 5 by serration connection.

The tilt bracket 2 serves to conduct a tilt movement relative to the attachment bracket 1 at the tilt position adjustment, and a front end side of the steering shaft 5 is rotatably supported by the tilt bracket 2. The tilt bracket 2 and the middle jacket 3 constitute a tilt jacket. In the present embodiment, a steering column is constituted by enclosing the steering shaft 5 with the tilt bracket 2, the middle jacket 3 and the upper jacket 4.

Figure 5:
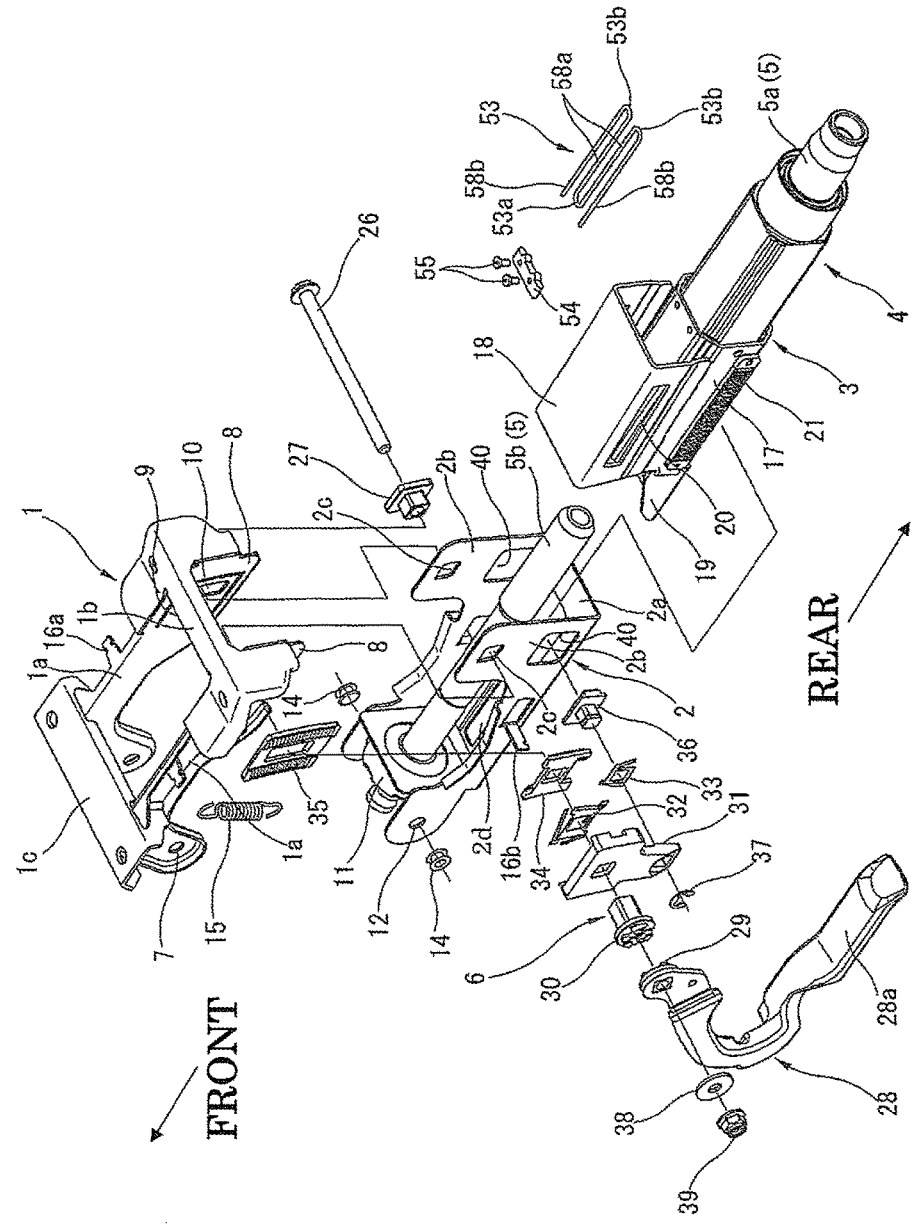
FIG. 5 is an exploded perspective view showing main parts of the steering column apparatus of FIG. 1.

As shown in FIGS. 1 and 5, the attachment bracket 1 is generally inversely U-shaped to have an opening at its bottom. It is formed of a pair of side wall portions 1a, 1a and a pair of stays 1b, 1c stretching between the side wall portions 1a, 1a. The attachment bracket 1 is fixed to a vehicle body by bolts (not shown in the drawings) passing through holes of the stays 1b, 1c to have a front-part-low posture as shown in FIG. 1.

As shown in FIG. 5, the attachment bracket 1 has shaft holes 7 at front end portions of the side wall portions 1a and clamping plate portions 8 at rear end portions of the side wall portions 1a. The clamping plate portions 8 project downwardly and are welded to the stay 1b at gaps 8a of their rear ends.

Figure 4:
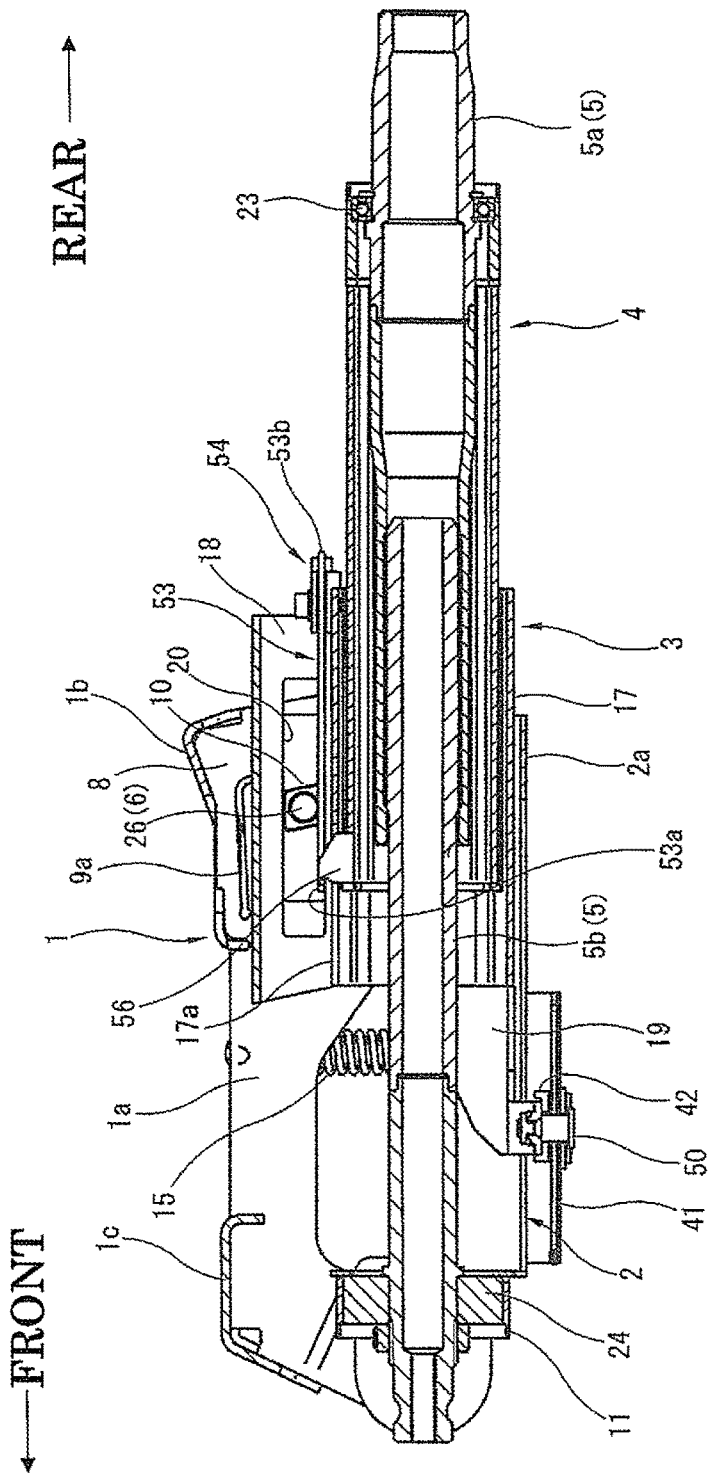
FIG. 4 is a vertical cross section showing the steering column apparatus of FIG. 2.

As shown in FIGS. 1, 4 and 5, the right clamping plate portion 8 is formed with a tongue portion 9 that is surrounded by a generally C-shaped slit 9a and serves as a deformable portion. As is clear form FIG. 1, this tongue portion 9 except its front end is cut away from the clamping plate portion 8 by the generally C-shaped slit 9a. With this, the tongue portion 9 is easily capable of elastic deformation within a range of its own elastic region, while maintaining the clamping plate portions 8, 8 themselves high in stiffness. Furthermore, as shown in FIGS. 1, 4 and 5, each clamping plate portion 8 has an arcuate elongate hole 10 for the tilt operation to have the axial hole 7 as center of curvature.

As shown in FIG. 5, the tilt bracket 2 is generally U-shaped in transverse section to be opened at its top. It has a pair of side wall portions and a bottom wall portion 2a extending therebetween. At its front end portion, a flanged, cylindrical, bearing holder 11 is arranged between the side wall portions. Furthermore, the tilt bracket 2 is formed at front end portions of the side wall portions with shaft holes 12. It is formed at the rear end portions of the side wall portions with a pair of clamping plate portions 2b formed to extend upwardly. The bottom wall portion 2a has a second elongate hole 2d formed therethrough along the front-back direction for the telescopic position adjustment (see FIG. 6). This second elongate hole 2d is described in detail hereinafter.

As shown in FIGS. 1 and 5, the tilt bracket 2 is inserted into an inside space of the attachment bracket 1 in assembly operation in a manner that the shaft hole 12 of the tilt bracket 2 is aligned with the axial hole 7 of the attachment bracket 1, and then tilt hinge pins 14 as tilt shafts are inserted therethrough and fixed by swaging. With this, the tilt bracket 2 is swingably supported by the attachment bracket 1 with the tilt hinge pins 14 as fulcrum. This makes it possible to have the tilt position adjustment. Since the tilt bracket 2 and the attachment bracket 1 respectively have U-shaped and inverse U-shaped cross sections, an overlapped portion of these has a generally box-shape after assembly.

Figure 3:
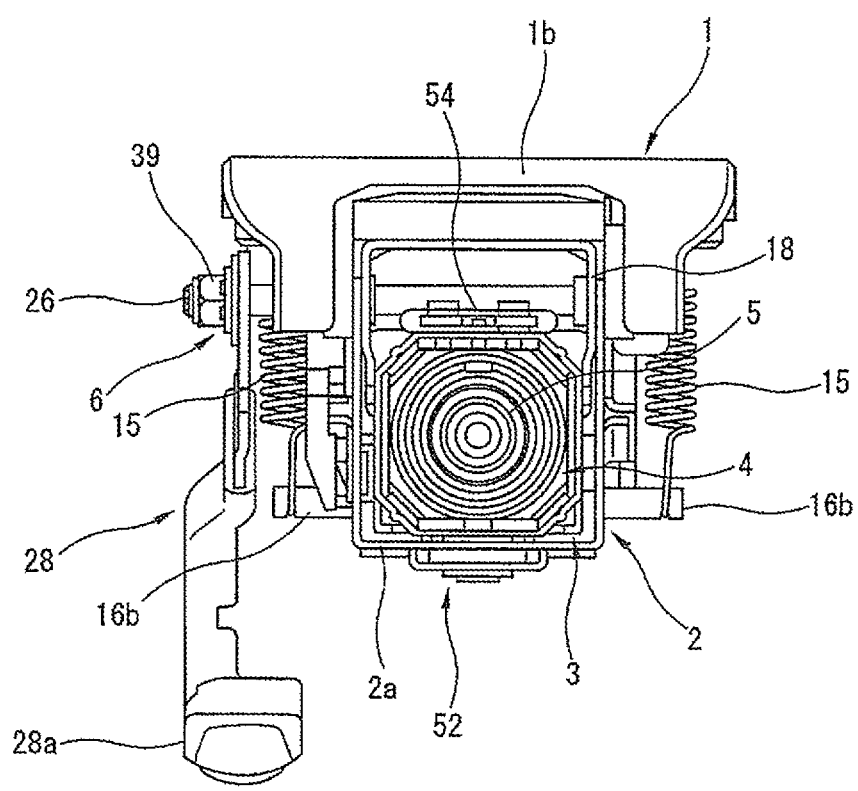
FIG. 3 is a rear view showing the steering column apparatus of FIG. 1.

As shown in FIGS. 1-3, two assist springs 15 of a tension coil spring type are disposed at outsides of the side wall portions of the tilt bracket 2. Each coil spring 15 is engaged at its upper end hook portion with an engaging plate 16a of the attachment bracket 1 and at its lower end hook portion with an engaging plate 16b formed on the side wall portion of the tilt bracket 2. With this, the tilt bracket 2, which is tilt position adjustable relative to the attachment bracket 1, is always biased upwardly, that is, in the counterclockwise direction in FIG. 2 with the tilt hinge pin 14 as a fulcrum. This prevents the steering column from falling down when the locking mechanism is in a released condition and reduces the driver's operational force to tilt the steering wheel in an upward direction.

The clamping plate portions 2b (see FIG. 5), which are formed at rear end portions of the side wall portions of the tilt bracket 2, are capable of elastic deformation in directions that the clamping plate portions 2b become close to and away from each other. Each clamping plate portion 2b is formed with a shaft hole 2c of a generally parallelogram shape.

The middle jacket 3 (see FIGS. 8A to 8C) is constituted of (a) a jacket body 17 having a hollow rod shape and a tetragonal or deformed octagonal shape in transverse section, (b) a distance bracket 18 as a distance portion fixed to the top surface of the jacket body 17, and (c) a U-shaped front bracket 19 extending from the front end of the jacket body 17.

The distance bracket 18 is inverse U-shaped to have an open bottom surface. As shown in FIG. 8C, the distance bracket 18 is fixed by welding or the like at its lower end portions, which are slightly closer to each other to catch the jacket body 17 therebetween, to the jacket body 17. In the middle jacket 3, the jacket body 17 has a hollow rod shape and a tetragonal or deformed octagonal shape in transverse section, but a box-shape section is formed between the jacket body 17 and the distance bracket 18 fixed to the top surface side of the jacket body 17. Thus, side wall portions of the distance bracket 18 are in sliding contact with the inner surface of the tilt bracket 2 and have first elongate holes 20 as a guide for the telescopic position adjustment of the steering wheel along the front-back direction.

Furthermore, as shown in FIGS. 2 and 5, the left side wall portion of the jacket body 17 in the middle jacket 3 has a toothed plate 21 having locking teeth, like a rack, in the front-back direction for locking the steering wheel in its telescopic adjustment. As mentioned hereinafter, the middle jacket 3 is slidably arranged in an inside defined between the attachment bracket 1 and the tilt bracket 2, and at the same time it is possible to clamp and retain the distance bracket 18 of the middle jacket 3 on its both sides by the clamping plate portions 8 of the attachment bracket 1 and the clamping plate portions 2b of the tilt bracket 2.

The upper jacket 4 (see FIGS. 1, 2, 4 and 5) also has a hollow rod shape and a tetragonal or deformed octagonal shape in transverse section. In other words, the upper jacket 4 and the jacket body 17 of the middle jacket 3 are defined as being similar figures. The upper jacket 4 is slidably inserted in the jacket body 17 through linear bearings or liner guides 22 (see FIG. 1). In the upper jacket 4, as shown in FIG. 4, an upper shaft 5a of the steering shaft 5 is rotatably supported through an upper bearing 23. A lower shaft 5b of the steering shaft 5 is connected to the upper shaft 5a by serration fitting to be movable in an axial direction and to be integrally rotatable relative to the upper shaft 5a. The lower shaft 5b is rotatably supported at its front end by a lower bearing 24 (see FIG. 4) that is supported by a bearing holder 11 of the tilt bracket 2 of FIG. 5. The lower shaft 5b is connected, for example, to an input section of a steering gear apparatus (not shown in the drawings) through a universal joint or an intermediate shaft.

As shown in FIGS. 1 and 2, the jacket body 17 of the middle jacket 3 and the upper jacket 4 are fixed to each other by conducting a positioning relative to each other in an axial direction and then pressing, for example, plastic shear pins 25 into pin holes formed through side wall portions of these to stretch therebetween. The shear pins 25 serve to maintain a connection therebetween to prevent a relative movement therebetween under normal conditions, but allow a relative movement therebetween by shear only when a load of a predetermined value or more is added to the upper jacket 4 at a vehicle collision.

As is clear from the above explanation, the tilt position adjustment of the steering wheel is conducted by a swing movement of the steering column formed of the tilt bracket 2, the middle jacket 3, the upper jacket 4, and the steering shaft 5 about the tilt hinge pin 14, and the telescopic position adjustment of the steering wheel is conducted by a relative movement between the middle jacket 3 and the tilt bracket 2 of the steering column.

The lock mechanism 6 shown in FIG. 5 is constituted of a locking bolt 26 as a clamping shaft, a stroke guide 27, an operation lever 28 with a handle portion 28a extending rearward, a ride-on cam member 29, a profile cam member 30, a teeth connecting plate 31, spring members 32, 33 of a plate spring type for the tilt locking and telescopic locking purposes, a lever-side, tilt locking, toothed plate 34, a fixed-side, tilt locking, toothed plate 35 opposed to the toothed plate 34, a lever-side, telescopic locking toothed plate 36, etc. The fixed-side, tilt locking, toothed plate 35 is fixed to the left clamping plate portion 8 and is formed with an elongate hole for the tilt operation.

The stroke guide 27 shown in FIG. 5 passes through the elongate hole 10 of the clamping plate portion 8 and a square hole 2c formed through the right clamping plate portion 2b of the tilt bracket 2. The stroke guide 27 is fitted and retained in the right-side, first elongate hole 20 formed through the distance bracket 18 of the middle jacket 3 in a manner that the stroke guide 27 is slidable in the front-back direction while its rotation is limited. The ride-on cam 29 is inrotatably fitted and retained in a square hole having a generally parallelogram shape of the operation lever 28. Each hole of the teeth connecting plate 31, the spring member 32, and the toothed plate 34 is inrotatably fitted to a prismatic portion of the profile cam member 30. The prismatic portion of the profile cam member 30 passes through the square hole 2c formed through the left clamping plate portion 2b of the tilt bracket 2, and is fitted and retained in the left-side, first elongate hole 20 formed through the distance bracket 18 of the middle jacket 3 in a manner to be slidable in the front-back direction while its rotation is limited. The lever-side, telescopic locking toothed plate 36 is formed with a prismatic portion. This prismatic portion is fitted into the spring member 33 to limit the rotation of the prismatic portion and is supported in a lower square hole of the teeth connecting plate 31 in a state that the prismatic portion is slidable in the axial direction of the lower square hole while its rotation is limited. A stopper ring 37 is engaged with the prismatic portion to retain the toothed plate 36.

In an assembled condition wherein the middle jacket 3 together with the tilt bracket 2 is received in an inside space defined by the inverse U-shaped attachment bracket 1, the locking bolt 26 passes through (a) the stroke guide 27 fitted and retained in the right square hole 2c of the tilt bracket 2, (b) the elongate hole 10 formed through the right clamping plate portion 8 of the attachment bracket 1, (c) the right square hole 2c of the tilt bracket 2, (d) the first elongate holes 20 formed through the distance bracket 18, (e) the left square hole 2c of the tilt bracket 2, (f) the fixed-side, tilt locking, toothed plate 35, (g) the lever-side, tilt locking, toothed plate 34, (h) the tilt-locking, spring member 32, (i) the teeth connecting plate 31, (j) the profile cam member 30 fitted and retained in the left square hole 2c of the tilt bracket 2, and (k) the ride-on cam member 29 fitted and retained in the square hole of the operation lever 28. The locking bolt 26 is retained by fastening a nut 39 through a bearing (thrust needle bearing) 38.

As mentioned above, the stroke guide 27 and the prismatic portion of the profile cam member 30 are respectively slidably fitted and retained in the right-side and left-side, first elongate holes 20 of the side wall portions of the distance bracket 18 of the middle jacket 3.

Both of the fixed-side, tilt locking, toothed plate 35 and the lever-side, tilt locking, toothed plate 34 are formed on their opposing surfaces with serrated locking teeth. In response to the rotation operation of the operation lever 28, the lever-side, tilt locking, toothed plate 34 is brought into meshing with the fixed-side, tilt locking, toothed plate 35 or released therefrom to achieve a locking or unlocking in the tilt position adjustment. As shown in FIG. 2, the lever-side, telescopic locking toothed plate 36 faces the toothed plate 21 of the middle jacket 3 through an opened window portion 40 of the tilt bracket 2. In response to the rotation operation of the operation lever 28, the former is similarly brought into meshing with the latter or released therefrom to achieve a locking or unlocking in the telescopic position adjustment.

Figure 6:
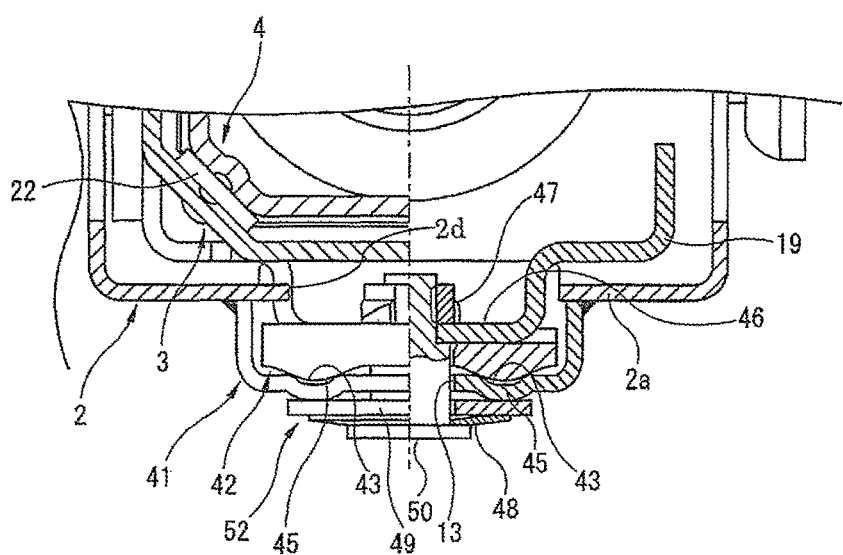
FIG. 6 is an enlarged sectional view showing main parts of the steering column apparatus of FIG. 3.

The telescopic position adjustment is conducted within a range of the first elongate holes 20 formed through the distance bracket 18 of the middle jacket 3. Furthermore, as shown in FIGS. 5 and 6, the second elongate hole 2d is also formed through the bottom wall portion 2a of the tilt bracket 2 for the telescopic position adjustment. The second elongate hole 2d is positioned forward than the first elongate holes 20.

Figure 7A:
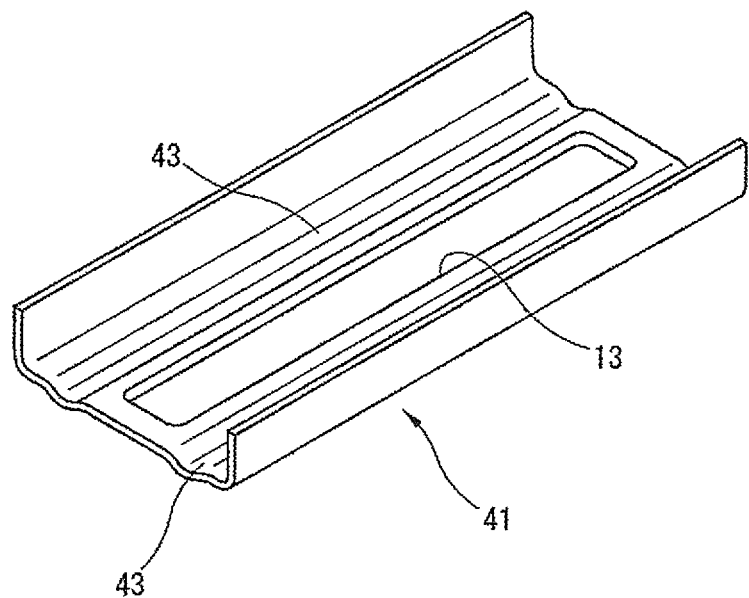
FIG. 7A is a perspective view showing a bottom bracket shown in FIG. 6.

As shown in FIGS. 1, 2, 4 and 6, a bottom bracket 41 is fixed by welding to the bottom wall portion 2a of the tilt bracket 2 such that the bottom bracket 41 downwardly projects from the bottom wall portion 2a. As shown in FIG. 7A, this bottom bracket 41 is generally U-shaped in section. A slider 42 as a sliding member made of plastic, which is shown in FIG. 7B, is arranged on the bottom bracket 41.

As shown in FIG. 4, as mentioned hereinafter, a front end portion (i.e., the after-mentioned seating flange portion 46) of the front bracket 19 of the middle jacket 3 is arranged on the slider 42. The bottom bracket 41, which is shown in FIG. 7A, has an elongate hole 13 formed therethrough for the telescopic position adjustment and two guide grooves 43, which are formed near the elongate hole 13 and are in parallel on both sides of the elongate hole 13. Each guide groove 43 has an arcuate section to have a concave top surface.

Figure 7B:
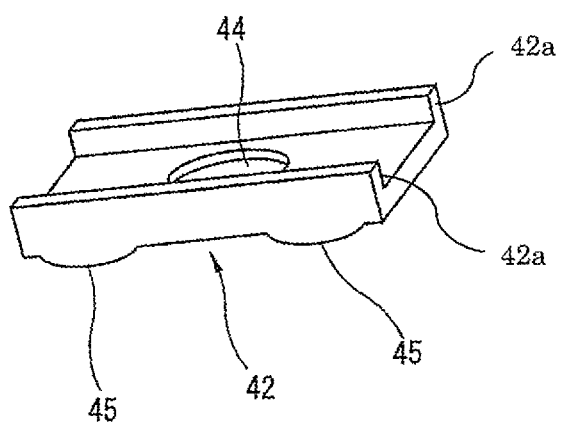
FIG. 7B is a perspective view showing a slider shown in FIG. 6.

The slider 42 shown in FIG. 7B has an attachment hole 44 formed therethrough and two projection portions 45 that are disposed on both sides of the attachment hole 44 and have an arcuate section to have convex bottom surfaces. These projection portions 45 are formed to respectively correspond to the guide grooves 43.

As shown in FIGS. 6, 7A and 7B, in an assembled condition in which the slider 42 is stacked on the bottom bracket 41, the attachment hole 44 of the slider 42 is placed directly above the elongate hole 13 of the bottom bracket 41, and the projection portions 45 are placed on the guide grooves 43 of the bottom bracket 41. In this case, radius of curvature of the guide groove 43 on the side to be in contact with the projection portion 45 is made smaller than that of the projection portion 45, such that the projection portions 45 of the slider 42 are in line contact with the guide grooves 43 of the bottom bracket 41 in a longitudinal direction of the guide grooves 43.

Figure 8A:
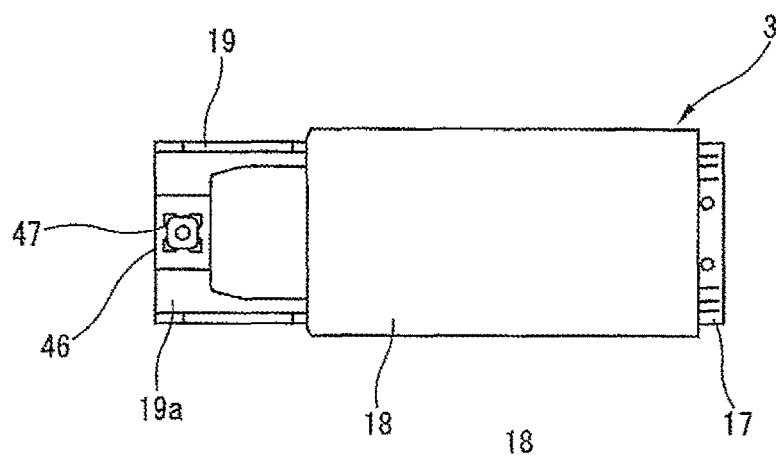
FIG. 8A is a plan view showing a distance bracket shown in FIG. 5.
Figure 8B:
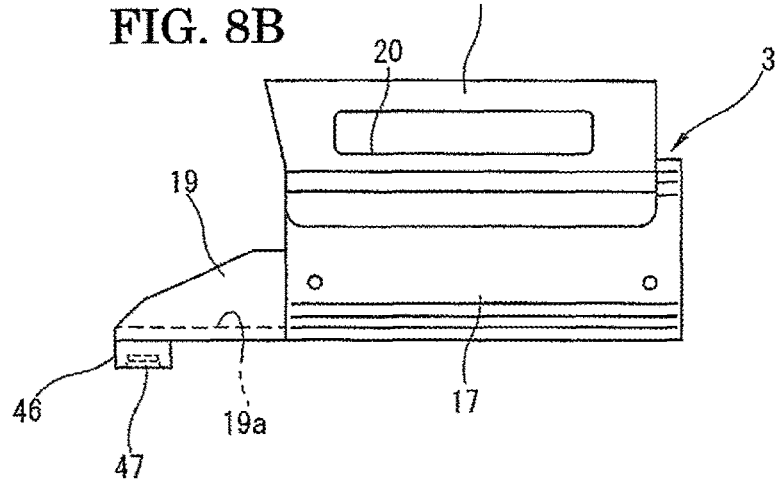
FIG. 8B is a side view showing the distance bracket of FIG. 8A.
Figure 8C:
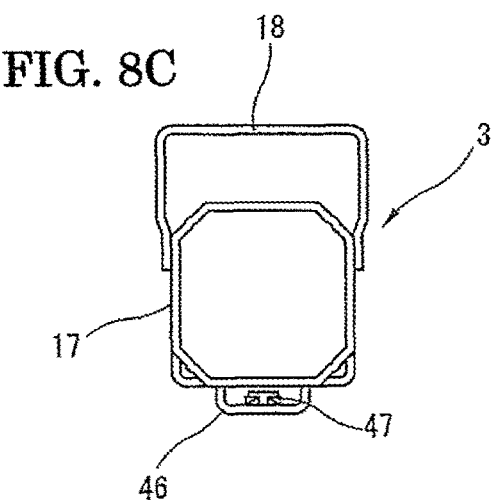
FIG. 8C is a front view showing the distance bracket of FIG. 8B.

As shown in FIGS. 8A to 8C, the U-shaped front bracket 19 is fixed by welding to the front end of the jacket body 17 as an extension in a forward direction. A generally U-shaped seating flange portion 46 is formed at the front end of a bottom wall portion 19a of the front bracket 19. This flange portion 46 (see FIG. 6) projects toward the side of the tilt bracket 2 and is opposed to the bottom bracket 41 and seated on the slider 42, such that the flange portion 46 is fitted between two straight projection portions 42a of the slider 42. A nut (projection nut) 47 is fixed by welding on the seating flange portion 46. The bottom wall portion 19a of the front bracket 19 is integrally formed with the bottom wall portion of the jacket body 17.

Figure 9:
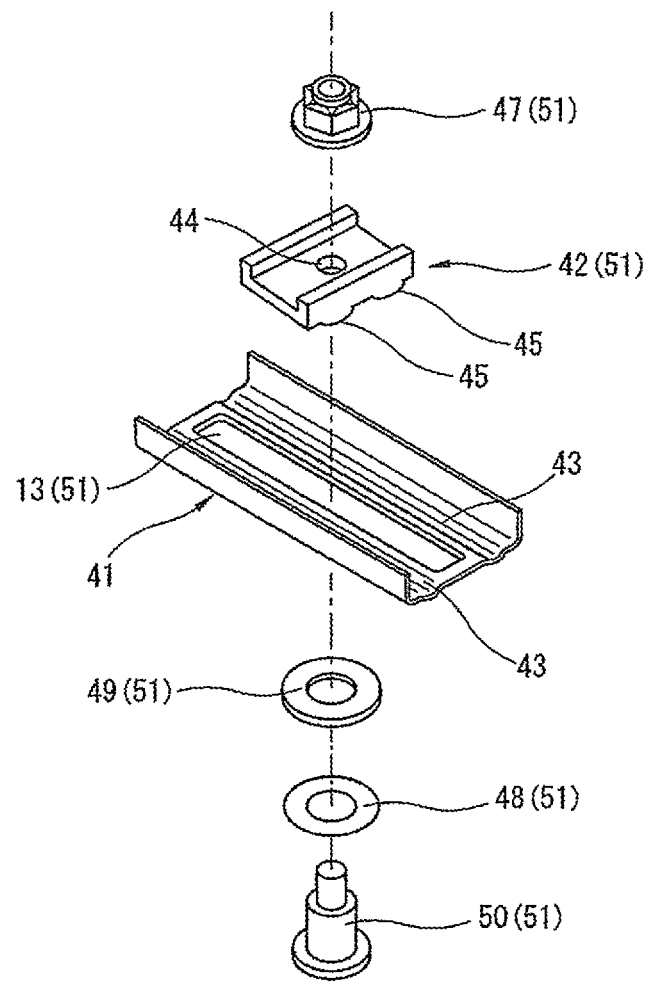
FIG. 9 is an exploded perspective view showing the main parts of FIG. 6.

FIG. 9 is an exploded view showing a relationship between the bottom bracket 41, the slider 42, and the nut 47 on the side of the front bracket 19, in which the front bracket 19 itself is omitted.

As shown in FIGS. 6 and 9, a bolt 50 as a fastening member is passed through a disc spring 48 as an elastic member, a washer 49, the elongate hole 13 of the bottom bracket 41, and the attachment hole 44 of the slider 42, and is screwed into the nut 47 fixed on the seating flange portion 46 of the front bracket 19, such that the bottom bracket 41, the slider 42, and the seating flange portion 46 of the front bracket 19 are elastically fastened together. With this, as shown in FIG. 6, the bottom bracket 41 and the washer 49 are in line contact with each other at two linear portions that are on the bottom surface of the bottom bracket 41 and are directly below the guide grooves 43. Furthermore, the projection portions 45 of the slider 42 are in press contact with the guide grooves 43 of the bottom bracket 41, such that each projection portion 45 and its corresponding guide groove 43 are in line contact at two portions in a longitudinal direction of the guide groove.

In this structure, for the telescopic position adjustment, the middle jacket 3 together with the slider 42 are slidably supported relative to the bottom bracket 41 of the tilt bracket 2, and the bottom bracket 41, the slider 42, and the seating flange portion 46 of the front bracket 19 are elastically fastened together. With this, there occurs no play in this structure in vertical and horizontal directions of FIG. 6.

The elongate hole 13 of the bottom bracket 41 has enough longitudinal length to allow the sliding movement of the bolt 50 in the elongate hole 13 during the telescopic position adjustment. Similarly, the second elongate hole 2d of the bottom wall portion 2a of the tilt bracket 2 has also an enough longitudinal length to allow the sliding movement of the seating flange portion 46 of the front bracket 19 of the middle jacket 3 in the second elongate hole 2d during the telescopic position adjustment. These longitudinal lengths of the elongate hole 13 and the second elongate hole 2d are generally the same. As shown in FIG. 6, the elongate hole 13 is positioned directly below the second elongate hole 2e, such that the bolt 50, the slider 42, and the seating flange portion 46 are aligned with each other in a vertical direction of FIG. 6.

As is clear from the above explanation, the middle jacket 3 is provided with a slide guide member 51 for the telescopic position adjustment that is formed by (a) the slider 42 as a slide member sandwiched between the bottom bracket 41 of the tilt bracket 2 and the front bracket 19 of the middle jacket 3, and (b) the disk spring 49, the washer 48, the bolt 50 and the nut 47 for elastically fastening the slider 42 between the bottom bracket 41 and the front bracket 19. At the same time, a telescopic guide mechanism 52 is formed by this slide guide member 51 and the elongate hole 13 of the bottom bracket 41.

As shown in FIG. 5, a wire guide 54 as a guide member (resistive member) is fixed by two fastening screws 55 (at least one fastening screw may be used) on the top surface of the rear end portion of the jacket body 17 of the middle jacket 3. In this wire guide 54, there is inserted and supported an energy absorbing wire (hereinafter simply referred to as "wire") for absorbing impact energy, which is made of a plastically deformable metal. As mentioned hereinafter, this wire 53 is one for absorbing a secondary impact energy at the vehicle collision.

Figure 10A:
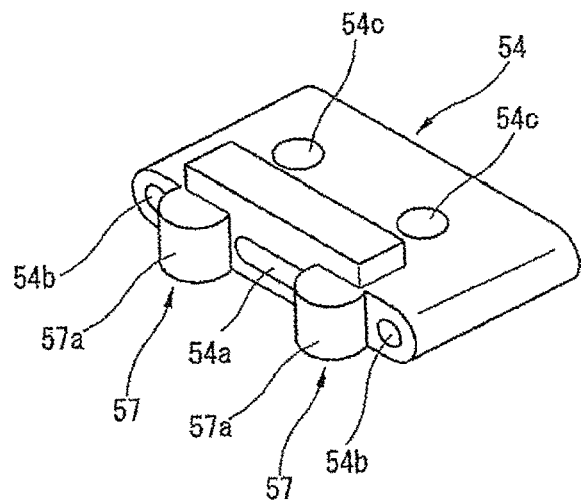
FIG. 10A is an enlarged perspective view showing a guide member of FIG. 5.

As shown in FIGS. 5 and 10A, the wire guide 54 is generally rectangular in plan view and made of plastic. It is formed with a pair of attachment holes 54c passing therethrough in the thickness direction for receiving the fastening screws 55. Furthermore, it is formed with a center hole 54a and left and right side holes 54b passing therethrough in the direction of the short side of the wire guide 54. Furthermore, it is formed on its rear long side (see FIG. 5) with (a) a left semicylindrical guide projection portion 57 positioned between the center hole 54a and the left side hole 54b and (b) a right semicylindrical guide projection portion 57 positioned between the center hole 54a and the right side hole 54b. Each attachment hole 54c is disposed at a position between the center hole 54a and the left or right side hole 54b. The center hole 54a is elongated (e.g., oval or rectangular) in section, and in contrast each side hole 54b has a size enough to allow insertion of the wire 53 therein. The outer surfaces of the left and right semicylindrical guide projection portions 57 respectively serve as left and right cylindrical or arcuate guide surfaces 57a for the wire 53, as mentioned hereinafter.

Figure 10B:
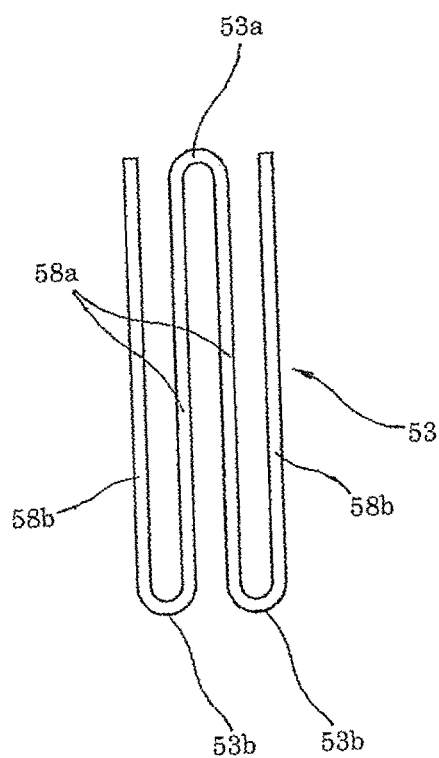
FIG. 10B is an enlarged plan view showing a wire of FIG. 5.

As shown in FIGS. 5 and 10B, the wire 53 is formed by bending a single metal wire that is circular in section, such that the wire 53 is generally flat W-shaped or generally flat M-shaped if FIG. 10B is turned upside down. Therefore, the wire 53 has (a) an inverse U-shaped, center portion having left and right center legs 58a extending from a base bent portion 53a, (b) a left side leg 58b extending toward a left side of the base bent portion 53a from a left curved bent portion 53b connecting the left side leg 58b and the left center leg 58a with each other, and (c) a right side leg 58b extending toward a right side of the base bent portion 53a from a right curved bent portion 53b connecting the right side leg 58b and the right center leg 58a with each other. The wire 53 is inserted and supported in the wire guide 54 by inserting the inverse U-shaped, center portion with the base bent portion 53a ahead into the center hole 54a and respectively inserting the left and right side legs 58b into the left and right side holes 54b.

Upon this, the left and right curved bent portions 53b are respectively wound around and supported on the left and right guide surfaces 57a of the projection portions 57. In a complete assembled condition of the steering column apparatus as shown in FIG. 4, the base bent portion 53a of the wire 53 is engaged with an engaging portion 56 formed at a front end portion of the upper jacket 4. As is clear from FIG. 4, the engaging portion 56 of the upper jacket 4 is received in a slit 17a of the middle jacket 3.

As is clear from the above explanation, an energy absorbing mechanism for energy absorption at vehicle collision is formed by the wire guide 54 as a guide member, the wire 53 inserted and supported in the wire guide 54, and the engaging portion 56 of the upper jacket 4 for an engagement with the base bent portion 53a of the wire 53. As is clear from FIG. 4, the wire guide 54 and the wire 53 as major components of the energy absorbing mechanism are arranged in a narrow space between the jacket body 17 of the middle jacket 3 and the locking bolt 26 of a locking mechanism 6.

Next, the tilt position adjustment operation and the telescopic position adjustment operation in the steering column apparatus having the above structure are explained.

As shown in FIGS. 1 and 2, it is a locked condition in which the handle portion 28a of the operation lever 28 extends to be generally parallel with the steering column. In this condition, a raised portion of the ride-on cam member 29 shown in FIG. 5 rides on a raised portion of the profile cam member 30. With this, both of the tilt position adjustment function and the telescopic position adjustment function of the steering column or steering wheel are in a locked condition.

That is, in the locked condition, the raised portions of the ride-on cam member 29 and the profile cam member 30 ride on each other. With this, the locking bolt 26 is pulled in a relative manner in its axial direction toward the operation lever 28, thereby narrowing the distance between the stroke guide 27 and a combination of the teeth connecting plate 31 and the profile cam member 30. With this, the tongue portion 9 of the right clamping plate portion 8 is elastically deformed in an inward direction. This also causes an inward elastic deformation of the right clamping plate portion 2b of the tilt bracket 2. With this, the distance bracket 18 of the middle jacket 3 is clamped between the pair of clamping plate portions 2b in the axial direction of the locking bolt 26. At the same time, the locking teeth of the lever-side, tilt locking, toothed plate 34 shown in FIG. 5 are meshed with the locking teeth of the fixed-side, tilt locking, toothed plate 35 fixed to the left clamping plate portion 8 of the attachment bracket 1. Furthermore, in the locked condition, the locking teeth of the lever-side, telescopic locking toothed plate 36 are meshed with the locking teeth of the toothed plate 21 formed on the left side wall of the middle jacket 3 due to an inward biasing force of the spring member 33 against the toothed plate 36 by receiving a pressing force from the teeth connecting plate 31.

Even when the locking teeth of the locking toothed plates 34, 36 are respectively meshed with the locking teeth of the locking toothed plates 35, 21 only at their respective tooth tips, it is possible to obtain a pressed engagement between the left clamping portion 8 and the teeth connecting plate 31 by a biasing force of the spring member 32 and a pressed engagement between the middle jacket 3 and the teeth connecting plate 31 by a biasing force of the spring member 33. Thus, the locked condition can be obtained with no effect on the axial force to be generated in the clamping bolt 26.

Thus, in the locked condition, the tilt bracket 2 is locked relative to the attachment bracket 1 to stop the tilt position adjustment, and the middle jacket 3 is locked relative to the tilt bracket 2 to stop the telescopic position adjustment.

In contrast, when conducting the tilt position adjustment in a vertical direction of a vehicle and the telescopic position adjustment in a front-back direction of a vehicle, the operation lever 28 is rotated in a clockwise direction in FIG. 2 by a predetermined degree by pressing the handle portion 28a down in a forward direction. With this, the raised portion of the ride-on cam member 29 falls into a depressed portion defined between the raised portions of the profile cam member 30, thereby reducing the tensile axial force of the locking bolt 26. With this, the fastening force of the locking mechanism, which has been acting on the clamping plate portions 8 of the attachment bracket 1, etc., is released, thereby obtaining an unlocked condition of the steering column apparatus.

In the unlocked condition, a combination of the teeth connecting plate 31 and the profile cam member 30 takes a position toward the operation lever 28 by the biasing forces of the spring members 32, 33. This reduces the biasing forces of the spring member 32, 33, thereby respectively releasing the toothed plates 34, 36 from the locking toothed plates 35, 21 to have an unmeshed condition therebetween.

Under this unlocked condition, it is possible to conduct a swing operation of the tilt bracket 2 in a vertical direction of the vehicle (the direction along the arrow "a" in FIG. 2) relative to the attachment bracket 1 about the tilt hinge pins 14 as a swing center, thereby achieving a tilt position adjustment of the steering column apparatus having an integral combination of the tilt bracket 2, the middle jacket 3 and the upper jacket 4 within a range of the longitudinal lengths of the elongate holes 110 formed through the pair of clamping plate portions 8 of the attachment bracket 1 and the longitudinal length of the elongate hole of the fixed-side, tilt locking, toothed plate 35.

Under the unlocked condition, it is possible to conduct a forward/backward movement of the upper jacket 4 together with the middle jacket 3 in the front-back direction of the vehicle (the direction along the arrow "b" of FIG. 2), thereby achieving a telescopic position adjustment within a range of the longitudinal lengths of the first elongate holes 20 formed through the distance bracket 18 of the middle jacket 3, the longitudinal length of the second elongate hole 2*d* formed through the bottom wall portion 2*a* of the tilt bracket 2, and the longitudinal length of the elongate hole 13 formed through the bottom bracket 41 of the tilt bracket 2. Since the locking bolt 26 passes through the first elongate holes 20, the locking bolt 20 does not interfere with the telescopic position adjustment.

After conducting the tilt position adjustment and/or the telescopic position adjustment, the operation lever 28 can be returned to the position shown in FIGS. 1 and 2 by an upward rotation to go back to the previous locked condition.

At a secondary collision by the driver against the steering wheel in a vehicle collision, when a load of a predetermined amount or more is added to the upper jacket 4 through the steering wheel and the steering shaft 5 to compress the steering column, the shear pins 25 shown in FIGS. 1 and 2 for fixing together the jacket body 17 of the middle jacket 3 and the upper jacket 4 are sheared, thereby allowing a compression action between the jacket body 17 and the upper jacket 4 with an interposal of the linear guides 22 shown in FIG. 1.

At the compression action between the jacket body 17 of the middle jacket 3 and the upper jacket 4, the wire 53, which is engaged at its base bent portion 53*a* with the engaging portion 56 of the upper jacket 4, is pulled in a frontward direction of the vehicle. Since the wire 53 is wound at its curved bent portions 53*b* around the guide surfaces 57*a* of the guide projection portions 57 of the wire guide 54 shown in FIG. 10A to have a predetermined curvature, the wire 53 is gradually pulled in a frontward direction of the vehicle in a manner that the wire 53 is continuously deformed to go along the guide surfaces 57*a* of the guide projection portions 57.

The deformation of the wire 53 at the guide surfaces 57*a* makes it possible to effectively and stably absorb the impact energy at a secondary collision by the driver in a vehicle collision. Since the engaging portion 56 is inserted in the slit 17*a* of the jacket body 17, it does not interfere with an assembly operation of the upper jacket 4 and the jacket body 17.

As mentioned above, in the energy absorbing mechanism 59 in the present embodiment, an assembly operation can be conducted by only inserting the wire 53 into the wire guide 54 as a guide member to be fixed to the jacket body 17 by screws. Therefore, it is substantially possible to conduct a post-installation of the energy absorbing mechanism 59 on the middle jacket 4 after an assembly operation of other parts. Its structure is simple and superior in assembly operation, and it suffices to use the wire guide 54 of a small size. Thus, its energy absorbing performance also becomes stable.

The wire guide 54 as a guide member is one which is generally rectangular in shape and thin in thickness and in which the attachment holes 54*c*, the center and left and right side holes 54*a*, 54*b* and the guide projection portions 57 have been put together. With this, the wire guide 54 can be made small in size, and the energy absorbing mechanism 59 including the wire guide 54 and the wire 53 is made compact. This improves design flexibility of the energy absorbing mechanism.

The wire guide 54 having the wire 53 inserted and supported therein is fixed on the top surface of the jacket body 17, and the engaging portion 56 formed on the front end portion of the upper jacket is engaged with the base bent portion 53*a* of the wire 53. This further improves assembly operation of the energy absorbing mechanism 59.

In the above-mentioned embodiment, a steering column apparatus equipped with the tilt position adjustment function and the telescopic position adjustment function was exemplarily explained, but the present invention may be applied to a steering column apparatus having only the tilt position adjustment function.

In the above-mentioned embodiment, there was shown an example in which the wire guide 54 for receiving and supporting the wire 53 is fixed on the side of the middle jacket 3 and in which one end (i.e., the base bent portion 53*a*) of the wire 53 is engaged with the side of the upper jacket 4, but the relative positions of the wire guide 53 and the wire 53 may be reversed. That is, the wire guide 54 for receiving and supporting the wire 53 may be fixed on the side of the upper jacket 4, and the one end of the wire 53 may be engaged with the side of the middle jacket 3.

With reference to FIGS. 11 to 18, a steering column apparatus according to the second embodiment of the present invention, which corresponds to the above-mentioned first and fifth to eighth steering column apparatuses, is explained in detail as follows. This steering column apparatus has basic structures and functions similar to those of the above-explained steering column apparatus according to the first embodiment of the present invention. Therefore, explanations of similar structures, functions, etc. of the steering column apparatus may be omitted in the following. Furthermore, it is needless to say that similar advantageous effects can be obtained by similar structures of the steering column apparatuses according to the first and second embodiments of the present invention. Therefore, the following descriptions of the steering column apparatus according to the second embodiment of the present invention may also be applied to that according to the first embodiment of the present invention, and vice versa, in terms of similar structures thereof.

Specifically, this steering column apparatus is also capable of conducting a tilt operation of the steering wheel in upward and downward directions and a telescopic operation of the steering wheel in forward and rearward directions.

Figure 11:
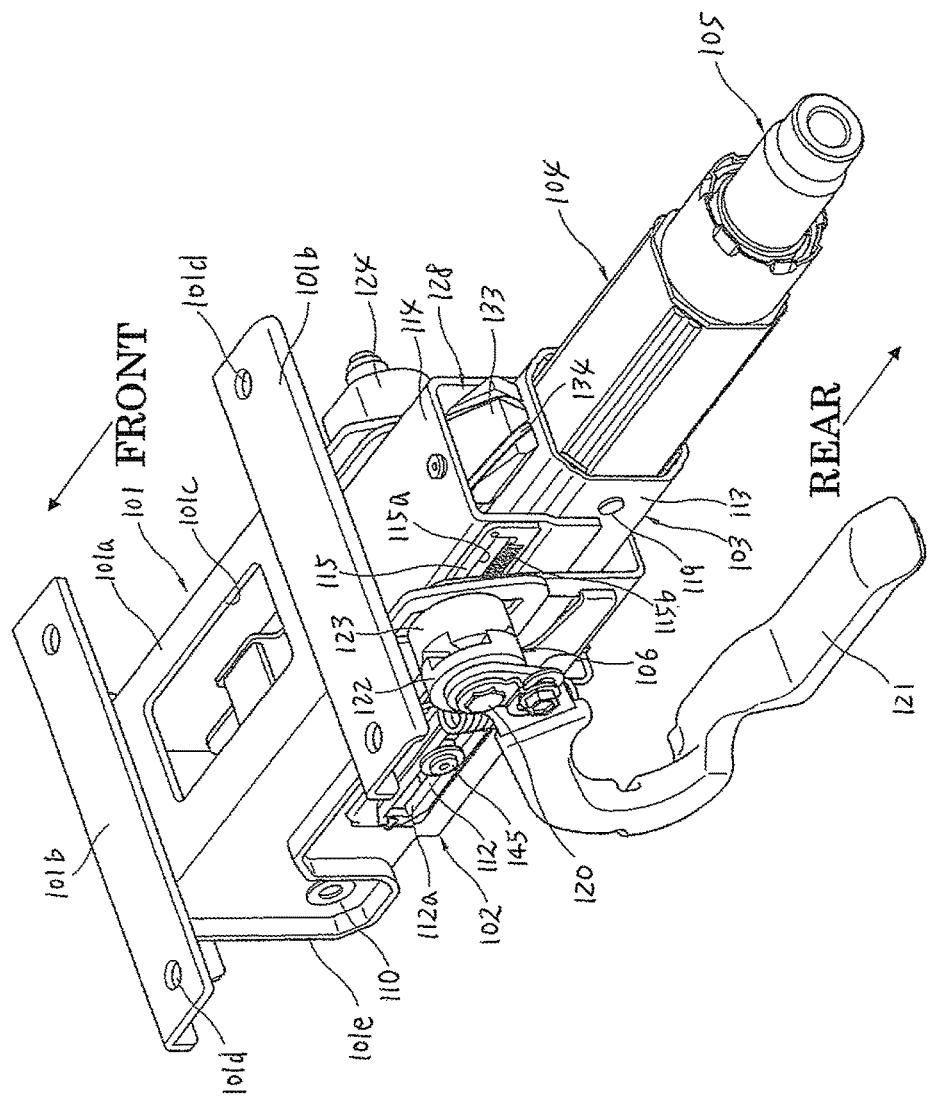
FIG. 11 is a perspective view showing a steering column apparatus according to a second embodiment of the present invention.
Figure 12:
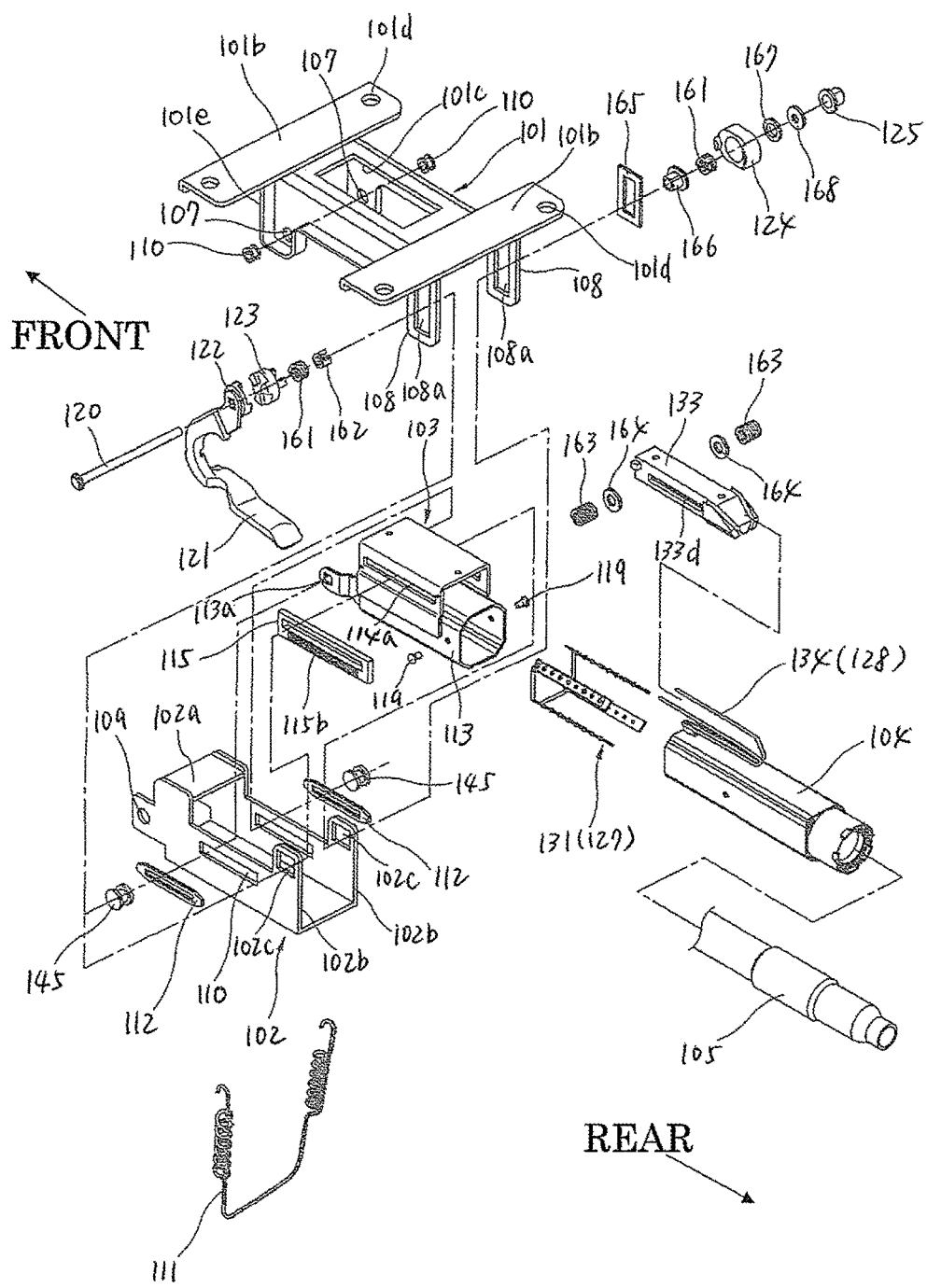
FIG. 12 is an exploded perspective view showing main parts of the steering column apparatus of FIG. 11.

As shown in FIGS. 11 and 12, the steering column apparatus is equipped with an attachment bracket 101, a lower jacket or tilt jacket 102, a middle jacket 103, an upper jacket 104, a steering shaft 105, and a locking mechanism 106 for locking or unlocking the attachment bracket 101, the lower jacket 102 and the middle jacket 103 with each other.

As shown in FIGS. 11 and 12, the attachment bracket 101 is formed of a body portion 101*a* and a pair of platy stays 101*b* fixed to the top surface of the body portion 101*a*. The body portion 101*a* is opened by having an opening portion 101*c* at a center portion on its top surface. The attachment bracket 101 is fixed to a vehicle body by bolts passing through holes 101*d* of the stays 101*b*. The attachment bracket 101 has reinforcing ribs 101e perpendicularly formed on lower peripheries of both side wall portions in the body portion 101a.

As shown in FIG. 12, the attachment bracket 101 is formed at rear end portions of both side wall portions with clamping plates 108. As is clear from FIG. 13, the clamping plates 108 are separated from the rear stay 101b and the body portion 101a in a vertical direction of FIG. 13. Therefore, the clamping plates 108 are elastically deformable to get closer to or away from each other within a range of its own elastic force. Furthermore, each clamping plate 108 has an arcuate elongate hole 108a about an axial hole 107. Thus, as mentioned hereinafter, the tilt position adjustment is possible within a range of this elongate hole 108a.

The lower jacket 102 shown in FIG. 12 is U-shaped in section and formed at its front end portion only into a box shape by the provision of an end plate 102a. The side wall portions of the lower jacket 102 are formed at their front-end extension portions with axial holes 109, at their center portions with elongate holes 110 in the front-back direction for the telescopic position adjustment, and at their rear end portions with clamping plate portions 102b extending upwardly.

Figure 14:
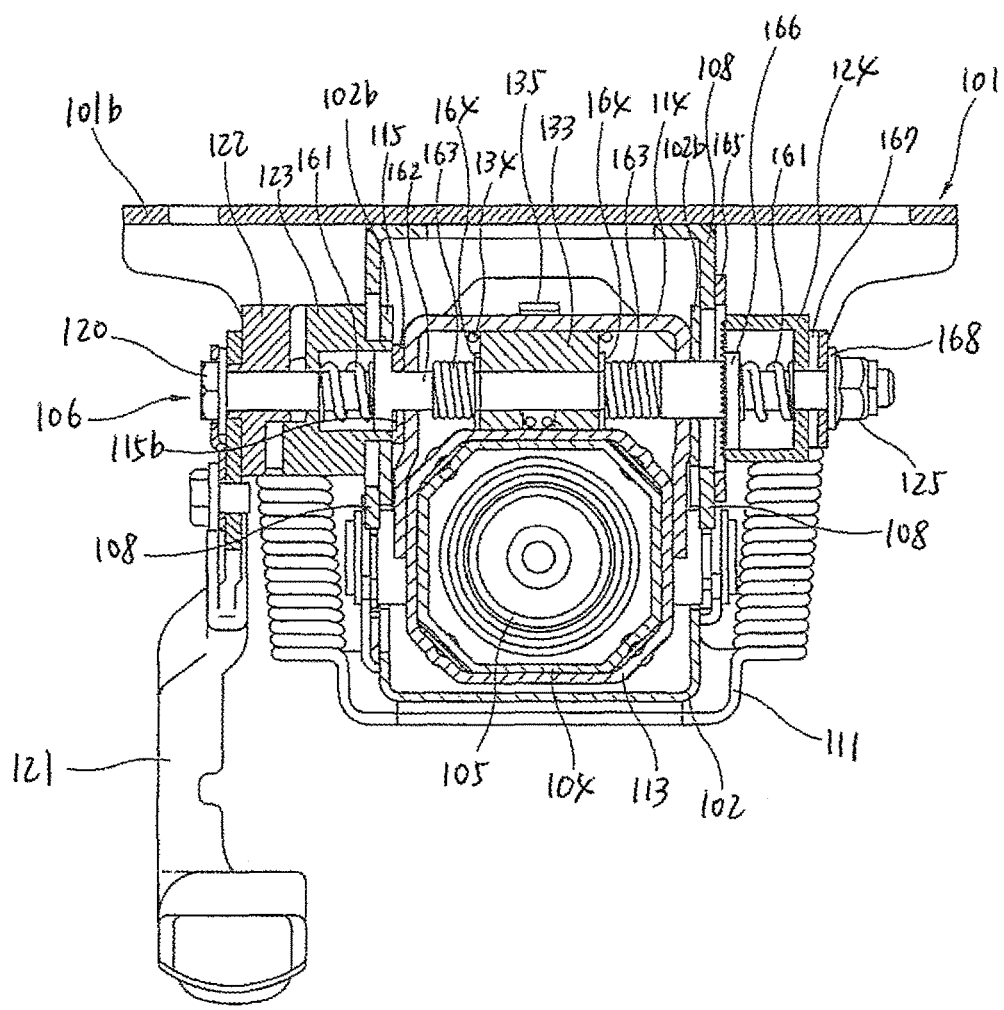
FIG. 14 is a transverse sectional view showing the steering column apparatus of FIG. 11.

As shown in FIG. 14, the lower jacket 102 is inserted into an inside space of the attachment bracket 101 in assembly operation in a manner that the axial hole 109 of the lower bracket 102 is aligned with the axial hole 107 of the attachment bracket 101, and then hinge pins 110 are inserted therethrough and fixed by swaging. With this, the lower bracket 102 is swingably supported by the attachment bracket 101 with the hinge pins 110 as fulcrum. This makes it possible to have the tilt position adjustment. Since the lower bracket 102 and the attachment bracket 101 respectively have U-shaped and inverse U-shaped cross sections, an overlapped portion of these has a generally box-shape after assembly.

Figure 13:
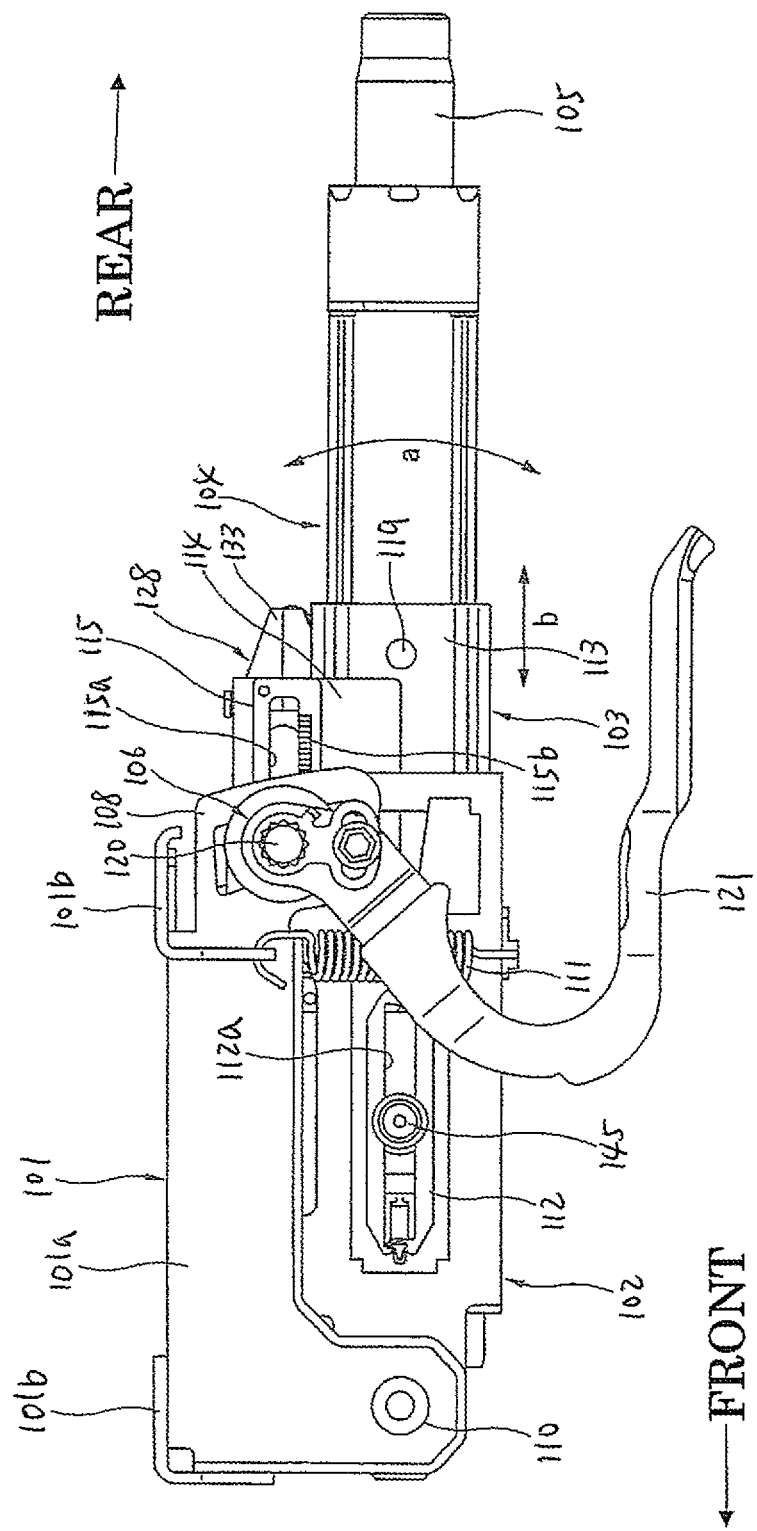
FIG. 13 is a side view showing the steering column apparatus of FIG. 11.

As shown in FIGS. 12-14, a return spring 111 of a tension coil spring type is installed in a manner to surround the lower jacket 102. As shown in FIG. 13, this return spring 111 is engaged at its top end hook portions with engagement holes formed through the rear stay 101b of the attachment bracket 101. With this, the lower bracket 102, which is tilt position adjustable relative to the attachment bracket 101, is always biased upwardly, that is, in the counterclockwise direction in FIG. 13 with the hinge pin 110 as a fulcrum.

As shown in FIG. 12, a slide guide 112 with an elongate hole 112a (see FIGS. 11 and 13) is fit from outside onto each elongate hole 110 formed through the lower jacket 102 for the telescopic position adjustment. A fastening pin 145 is slidably inserted into each of the elongate holes 110, 112a. The slide guide 112 is formed, for example, of a resin material being small in coefficient of friction.

The clamping plate portions 102b, which are formed at rear end portions of both side wall portions of the lower jacket 102, are elastically deformable within a range of their own elastic forces in a direction to get closer to or away from each other. Each clamping plate portion 102b has a square or rectangular shaft hole 102c.

The middle jacket 103 shown in FIGS. 11 and 12 is constituted of (a) a jacket body 113 having a hollow rod shape and a tetragonal or deformed octagonal shape in transverse section, (b) a distance bracket 114 fixed to the top surface of the jacket body 113, and (c) a pair of sliding contact plates 113a extending from front ends of both side wall portions of the jacket body 113.

The distance bracket 114 is inverse U-shaped to have an open bottom surface. As shown in FIG. 12, the distance bracket 114 is fixed by welding or the like at its lower end portions, which are away from each other to catch the jacket body 113 therebetween, to the jacket body 113. In the middle jacket 103, the jacket body 113 has a hollow rod shape and a tetragonal or deformed octagonal shape in transverse section. Besides, the middle jacket 103 is provided with the distance bracket 114 to have a box-shape section, in which the jacket body 113 is half covered with the distance bracket 114 until lower ends of the distance bracket 114 reach generally center positions of the side surfaces of the jacket body 113, which center positions are generally on a horizontal line passing through the center of the steering column in FIG. 14. This box-shape section makes it possible to provide a sliding contact of the middle jacket 103 with inner side surfaces of the lower jacket 102. Side wall portions of the distance bracket 114 have elongate holes 114a for the telescopic position adjustment along the front-back direction.

Furthermore, as shown in FIG. 12, the left side-wall portion of the distance bracket 114 has a depressed surface with respect to the surface to be in contact with the inner surface of the lower jacket 102. A toothed plate 115 is fixed on the depressed surface and has an elongate hole 115a (see FIGS. 11 and 13) to be aligned with the elongate hole 114a.

Herein, as shown in FIGS. 11 and 13, the toothed plate 115, which is fixed on the left side of the distance bracket 114, is formed with a toothed surface 115b, having a configuration like a rack, along a lower edge of the elongate hole 115a. This toothed surface 115b is depressed from the surface of the toothed plate 115. Therefore, in an assembled condition with the lower jacket 102, this toothed surface 115b is not in contact with the inner surface of the left clamping plate portion 102b of the lower jacket 102. Thus, as mentioned hereinafter, the distance bracket 114 of the middle jacket 103 is clamped by the attachment bracket 101 and the lower jacket 102 through their elastic deformations.

As shown in FIG. 12, the pair of sliding contact plates 113a extending from front ends of both side wall portions of the jacket body 113 is elastically deformable within its own elastic force in a direction to get closer to or away from each other. Each sliding contact plate 113a has a shaft hole.

In an assembled condition in which the middle jacket 103 is received in an inner space of the lower jacket 102, fastening pins 145 are inserted into the elongate holes 112a of the slide guides 112, the elongate holes 110 of the lower jacket 102, and the shaft holes of the sliding contact plates 113a, and then fixed to the sliding contact plates 113a by swaging. With this, the sliding contact plates 113a are connected to be slidable along the elongate holes 110 of the lower jacket 102. As a result, the middle jacket 103 is supported by the lower jacket 102 to be slidable in its axial direction.

Figure 15:
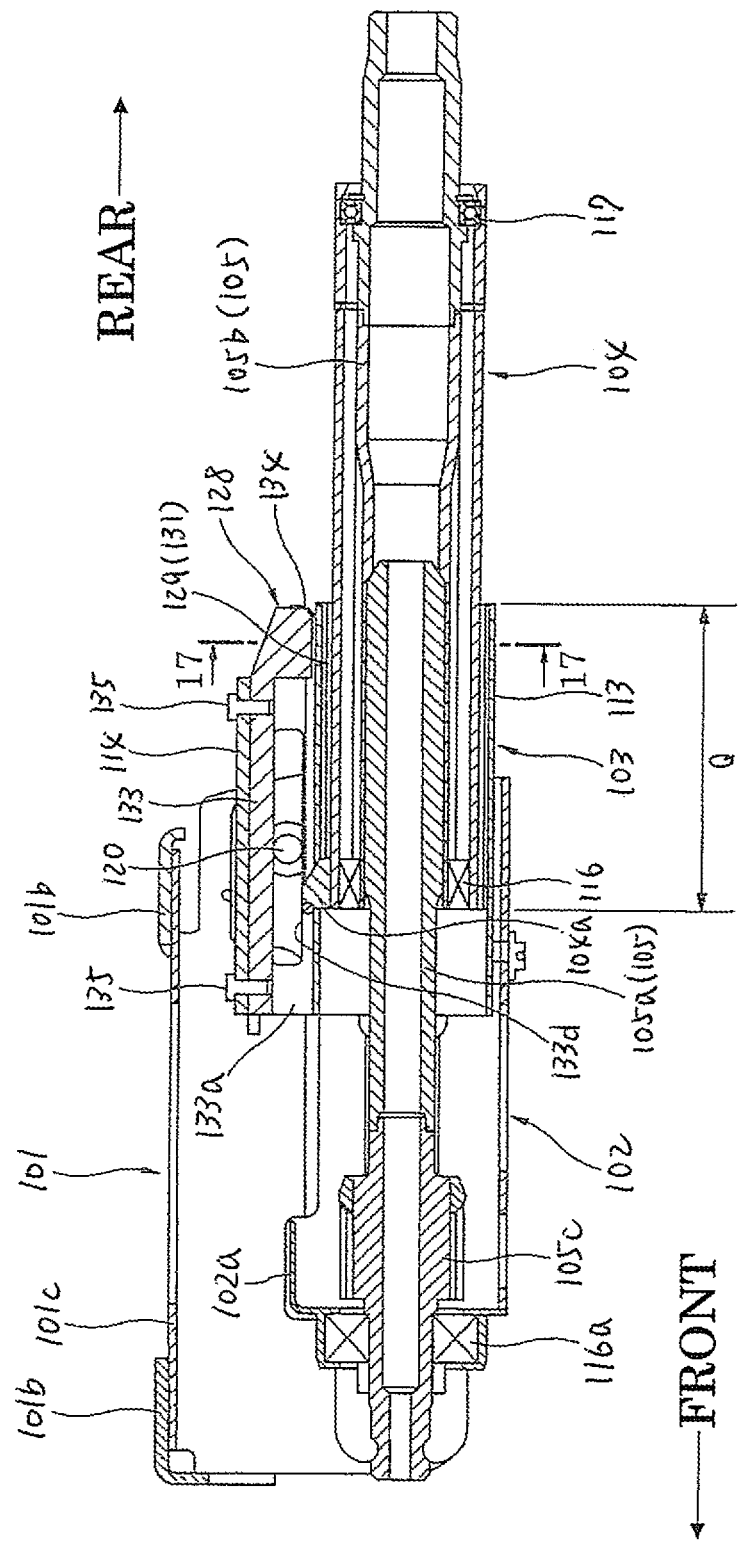
FIG. 15 is a vertical sectional view showing the steering column apparatus of FIG. 13.

The upper jacket 104 (see FIGS. 11 and 12) also has a hollow rod shape and a tetragonal or deformed octagonal shape in transverse section. In other words, the upper jacket 104 and the jacket body 113 of the middle jacket 103 are defined as being similar figures. The upper jacket 104 is slidably inserted in the jacket body 113. In the upper jacket 104, as shown in FIG. 15, an upper shaft 105b is rotatably supported through bearings 116, 117. A lower shaft 105a is connected to the upper shaft 105b by serration fitting to be movable in an axial direction and to be integrally rotatable relative to the upper shaft 105b. A front end of the lower shaft 105a is rotatably supported by the lower jacket 102 through a bearing 116a and has a key lock collar attachment portion 105c to be connected to a steering gear through a universal joint and other shaft members.

Figure 16:
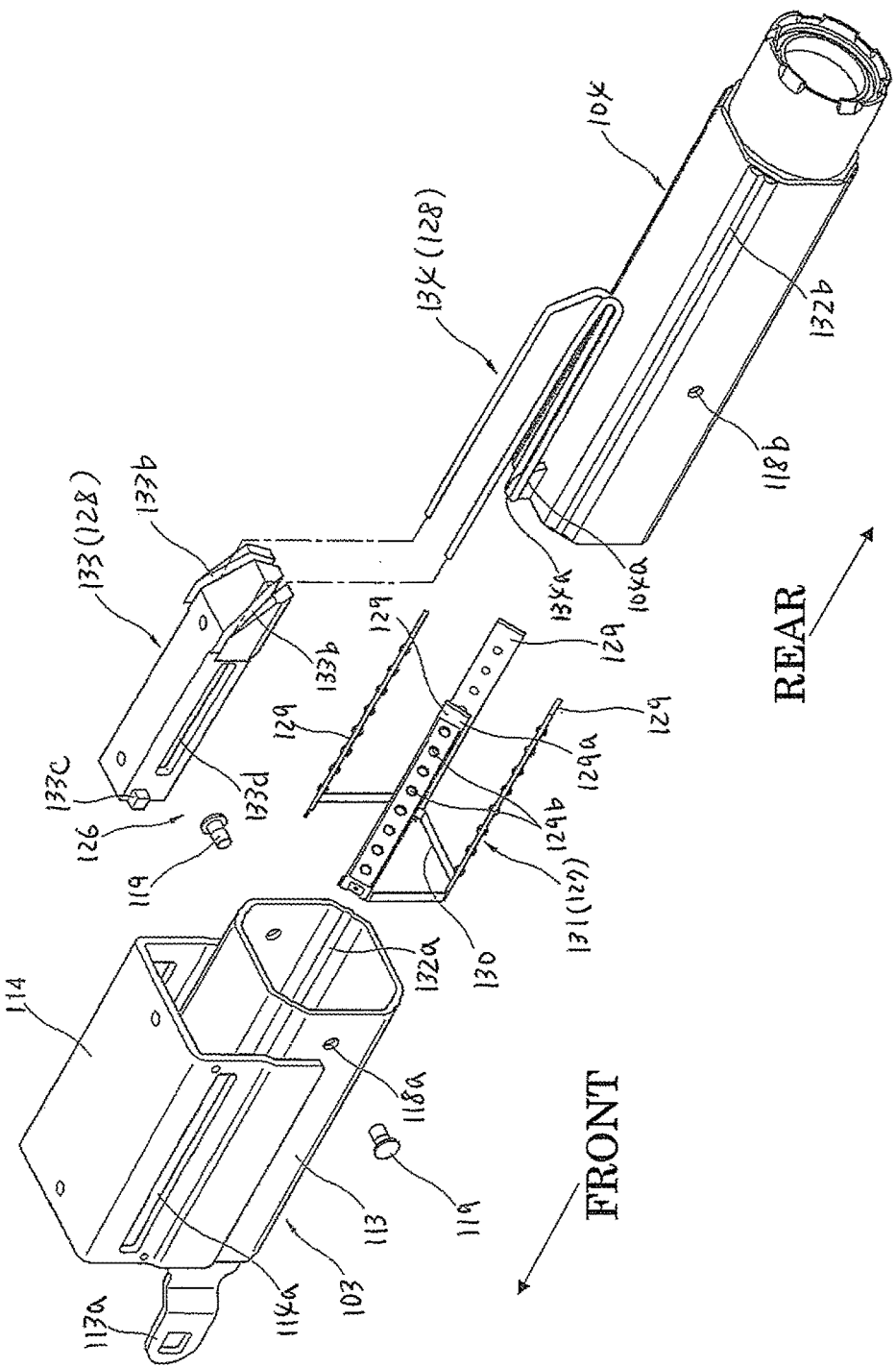
FIG. 16 is an exploded perspective view showing an impact energy absorbing mechanism in the steering column apparatus of FIG. 11.

As shown in FIGS. 11, 13 and 16, the jacket body 113 of the middle jacket 103 and the upper jacket 104 are fixed to each other by conducting a positioning relative to each other in an axial direction and then pressing, for example, plastic shear pins 119 into pin holes formed through side wall portions of these to stretch therebetween. The shear pins 119 serve to maintain a connection therebetween to prevent a relative movement therebetween under normal conditions, but allow a relative movement therebetween by shear only when a load of a predetermined value or more is added to the upper jacket 104 at a vehicle collision.

The locking mechanism shown in FIG. 12 is constituted of an operation shaft 120, an operation lever 121, an annular movable cam member 122, a fixed cam member 123, etc. In an assembled condition in which the middle jacket 103 together with the lower jacket 102 is received in an inner space of the attachment bracket 101, the operation shaft 120 is inserted in a manner to pass through (a) the operation lever 121, (b) the movable cam member 122, (c) the fixed cam member 123, (d) a locking spring 161, (e) a locking member 162, (0 the left elongate hole 108a formed through the left clamping plate portion 108 of the attachment bracket 101, (g) the left shaft hole 102c of the left clamping plate portion 102b of the lower jacket 102, (h) the elongate hole 115a of the toothed plate 115, (i) the left elongate hole 114a of the distance bracket 114, (j) elongate holes 133d of a resistive block or member 133 fixed in an inside space of the distance bracket 114, (k) the right elongate hole 114a, (l) the right shaft hole 102c of the right clamping plate portion 102b, and (m) the right elongate hole 108a. As shown in FIG. 14, the locking member 162 passes through the left elongate hole 108a, the left shaft hole 102c, the elongate hole 115a, and the left elongate hole 114a. The locking member 162 has locking teeth capable of meshing with the toothed surface 115b of the toothed plate 115.

After projecting from the right clamping plate portion 108, the operation shaft 120 passes through a toothed plate 165, a locking member 166, a locking spring 161, a receiving piece 124, a thrust bearing 167, and a washer 168. The operation shaft 120 is retained by fastening a nut 125.

The operation shaft 120 is fixed to be integrally movable together with the operation lever 121 and the movable cam member 122 and passes through the fixed cam member 123 to be movable relative to the fixed cam member 123. The fixed cam member 123 is inrotatably fitted into the left elongate hole 108a of the left clamping plate portion 108, and the receiving piece 124 is also inrotatably fitted onto the right clamping plate portion 108. The toothed plate 165 is fixed onto the right clamping plate portion 108, and has an elongate hole to be aligned with the elongate hole 108a. The toothed plate 165 is formed along an edge of its elongate hole with a toothed surface that is capable of meshing with locking teeth of the locking member 166. Therefore, when the operation lever 121 is rotated, the operation lever 121, the operation shaft 120 and the movable cam member 122 are integrally rotated to make a relative rotation between the movable cam member 122 and the fixed cam member 123. The movable cam member 122 and the fixed cam member 123 are formed on their opposing surfaces with cam surfaces each having raised portions and depressed portions alternately formed in the circumferential direction with an interposal of an inclined surface between the raised portion and the depressed portion. One release spring 163 is disposed between the locking member 162 and the left side surface of the resistive block 133 through a washer 164 on the side of the resistive block 133, and another release spring 163 is disposed between the locking member 166 and the right side surface of the resistive block 133 through a washer 164 on the side of the resistive block 133. Each release spring 163 is set to have a spring force that is weaker than that of the locking spring 161.

The tilt position adjustment operation and the telescopic position adjustment operation in the steering column apparatus having the above structure according to the second embodiment of the present invention are explained in the following.

As shown in FIG. 11, it is a locked condition in which the operation lever 121 extends to be generally parallel with the steering column. In this condition, the movable cam member 122 and the fixed cam member 123 ride on each other at their raised portions. With this, both of the tilt position adjustment function and the telescopic position adjustment function of the steering column or steering wheel are in a locked condition.

That is, in the locked condition, the raised portions of the movable cam member 122 and the fixed cam member 123 ride on each other. With this, the operation shaft 120 is pulled in a relative manner in its axial direction toward its head side, thereby narrowing the distance between the fixed cam member 123 and the receiving piece 124. With this, the distance bracket 114 of the middle jacket 103 is clamped between the pair of clamping plate portions 102b in the axial direction of the operation shaft 120. At the same time, the locking teeth of the locking member 162 are meshed with toothed surface 115a of the toothed plate 115 formed on the left side of the distance bracket 114, and locking teeth of the locking member 166 are meshed with the toothed surface of the toothed plate 165 formed on the right clamping plate portion 108.

Even when the locking teeth of the locking members 162, 166 are respectively meshed with the toothed surfaces of the toothed plates 115, 165 only at their respective tooth tips, it is possible to obtain a pressed engagement therebetween by an elastic deformation of the locking spring 161 to achieve the locked condition.

Thus, in the locked condition, the lower bracket 102 is locked relative to the attachment bracket 101 to stop the tilt position adjustment, and the middle jacket 103 is locked relative to the lower bracket 102 to stop the telescopic position adjustment.

In contrast, when conducting the tilt position adjustment in a vertical direction of a vehicle and the telescopic position adjustment in a front-back direction of a vehicle, the operation lever 121 is rotated in a clockwise direction in FIG. 13 by a predetermined degree. With this, the raised portion of the movable cam member 122 falls into a depressed portion of the fixed cam member 123, thereby reducing the tensile axial force of the operation shaft 120. With this, the fastening force of the locking mechanism, which has been acting on the clamping plate portions 108 of the attachment bracket 101, etc., is released, thereby obtaining an unlocked condition of the steering column apparatus. In this unlocked condition, the locking members 162, 166 are respectively released from the toothed plates 115, 165 by the release springs 63.

Under this unlocked condition, it is possible to conduct a swing operation of the lower bracket 102 in a vertical direction of the vehicle (the direction along the arrow "a" in FIG. 13) relative to the attachment bracket 101 about the tilt hinge pins 110 as a swing center, thereby achieving a tilt position adjustment of the steering column apparatus having an integral combination of the lower bracket 102, the middle jacket 103 and the upper jacket 104 within a range of the longitudinal lengths of the elongate holes 108*a* formed through the pair of clamping plate portions 108 of the attachment bracket 101.

Under the unlocked condition, it is possible to conduct a forward/backward movement of the upper jacket 104 together with the middle jacket 103 in the front-back direction of the vehicle (the direction along the arrow "b" of FIG. 13), thereby achieving a telescopic position adjustment within a range of the longitudinal lengths of the elongate holes 110, 112*a* of the lower jacket 102 and the slide guide 112. Since the operation shaft 120 passes through the elongate holes 114*a* formed through the distance bracket 114 of the middle jacket 103, the operation shaft 120 does not interfere with the telescopic position adjustment.

After conducting the tilt position adjustment and/or the telescopic position adjustment, the operation lever 121 can be returned to the position shown in FIGS. 11 and 13 by an upward rotation to go back to the previous locked condition.

As mentioned above, the middle jacket 103 is slidably fixed to the lower jacket 102 for the telescopic position adjustment by means of the fastening pins 145, which are inserted into the elongate holes 110 of the lower jacket 102 and fixed to the sliding contact plates 113*a* of the middle jacket 103. With this, the middle jacket 103 is securely slidably retained at its front end too within the lower jacket 102. Thus, the steering column apparatus as a whole is improved in support stiffness and in flexural stiffness in vertical and horizontal directions.

As mentioned above, the jacket body 113 of the middle jacket 103 and the upper jacket 104 to be inserted therein are defined as being similar figures to have a rod shape that is tetragonal or deformed octagonal in transverse section. Furthermore, the generally U-shaped lower jacket 102 is received in the generally inverse U-shaped attachment bracket 101 to have a closed box shape. Thus, the steering column apparatus as a whole is further improved in support stiffness and in flexural stiffness in vertical and horizontal directions.

Due to their own elastic forces of the sliding contact plates 113*a*, it is possible to suppress deformation and/or play at the front end of the jacket body 113 in the middle jacket 103.

Mainly with reference to FIGS. 16 to 18 in FIGS. 11 to 18, an impact energy absorbing mechanism 126 in the steering column apparatus according to the second embodiment of the present invention is explained in the following.

The impact energy absorbing mechanism 126 in the steering column apparatus, shown in FIG. 6, is constituted of (a) a contraction guide section 127 for allowing a smooth contraction action based on a sliding movement of the upper jacket 104 relative to the jacket body 113 of the middle jacket 103, and (b) an energy absorbing section 128 that serves as a load generating section for absorbing an input load caused by the contraction action of the jacket body 113 and the upper jacket 104.

As shown in FIGS. 15-16, the jacket body 113 of the middle jacket 103 and the upper jacket 104 are overlapped with each other by a predetermined overlap length Q when they are connected with each other by shear pins 119.

As shown in FIG. 16, four liner guides 129 of a linear ball-bearing type as straight-movement guide members are installed between the jacket body 113 of the middle jacket 103 and the upper jacket 104. Each liner guide 129 has a thin strip retainer 129*a* and steel balls 129*b* as rolling elements rotatably retained in the retainer 129*a* in the longitudinal direction. The four liner guides 129 are united at their front ends by thin plate stays 130 into a linear guide unit 131. This linear guide unit 131 has a length equal to the overlap length Q between the jacket body 113 of the middle jacket 103 and the upper jacket 104. As is clear from FIG. 17, the linear guide unit 131 is arranged in a gap G provided between the jacket body 113 and the upper jacket 104.

Figure 17:
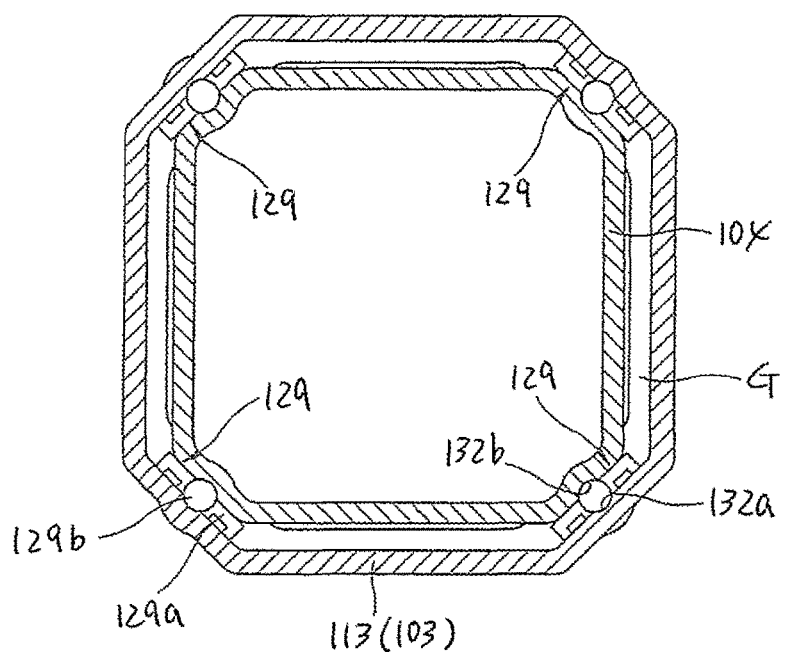
FIG. 17 is an enlarged sectional view taken in the line 17-17 of FIG. 15.
Figure 18:
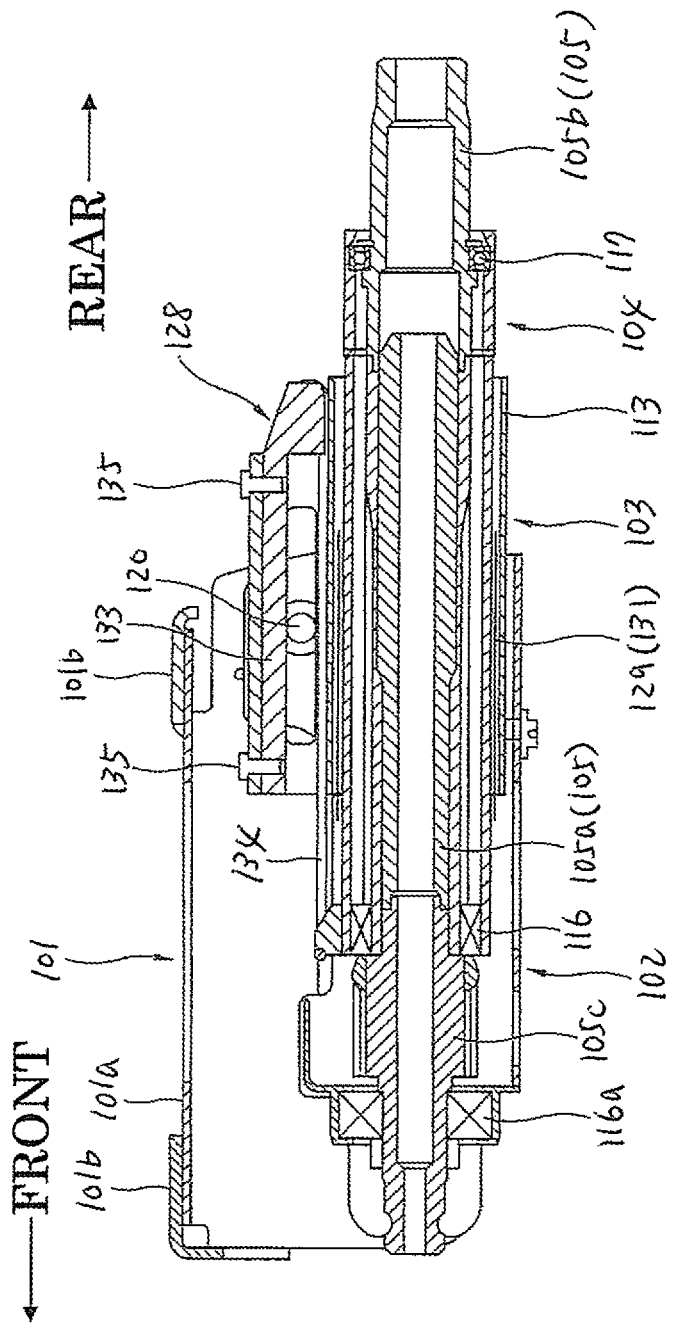
FIG. 18 is a view similar to FIG. 15, but showing a condition after the impact energy absorption.

More specifically, as shown in FIG. 17, the linear guide unit 131 is installed, such that each linear guide 129 is positioned between a short side of the jacket body 113 and a short side of the upper jacket 104.

Herein, as is clear from FIG. 17, each ball 129*b* is seated in an arcuate guide groove 132*a* formed on an inner surface of the short side of the jacket body 113 along its longitudinal direction and in an arcuate guide groove 132*b* formed on an outer surface of the short side of the upper jacket 104 along its longitudinal direction. Each guide groove 132*a*, 132*b* serves as a track groove of the ball 129*b*. Thus, at a contraction action between the jacket body 113 of the middle jacket 103 and the upper jacket 104, the balls 129*b* of each linear guide 129 turn to roll along the guide grooves 132*a*, 132*b* with an extremely low friction coefficient.

As is clear from the above explanation, of the impact energy absorbing mechanism 126, the contraction guide section 127 is formed of the guide groove 132*a* on the side of the jacket body 113, the guide groove 132*b* on the side of the upper jacket 104, and the linear guide unit 131 as an assembly of the four linear guides 129. The contraction guide section 127 allows a smooth contraction action between the jacket body 113 of the middle jacket 103 and the upper jacket 104 by a sliding action of the upper jacket 104 relative to the jacket body 113.

As shown in FIGS. 11, 13 and 15, the energy absorbing section 128 of the impact energy absorbing mechanism 126 is arranged in a box-shape space between the jacket body 113 of the middle jacket 103 and the distance bracket 114. As shown in FIG. 16, this energy absorbing section 128 is formed of the resistive block 133 as a resistive member and a wire 134 wound around this resistive block 133.

As shown in FIG. 13, the resistive block 133 stretches to cover the entire longitudinal length of the distance bracket 114 and to rearwardly project from the distance bracket 114. The resistive block 133 is integrally fixed to the distance bracket 114 by a pair of front and rear screws 135.

As shown in FIG. 16, a rear end portion of this resistive block 133 projects rearwardly from the distance bracket 114, is wider than the rest of the resistive block 133, and is rearwardly tapered, such that the resistive block 133 is generally formed into a shape of a sewing machine shuttle. A lower half portion of the rest of the resistive block 133 is slotted to have a slot 133*a* shown in FIG. 15. A pair of wire guides 133*b* extends from the bottom surface of the rear end portion of the resistive block 133 and stretches over the top surface of the resistive block 133 to have a generally V-shape. The resistive block 133 is formed at its front end portion with engaging guide portions 133*c* projecting from its side walls.

The resistive block 133 has elongate holes 133*d* to be aligned with the elongate holes 114*a* of the distance bracket 114. As a result, as shown in FIGS. 13 and 15, the operation shaft 120 of the locking mechanism 106 passes through the elongate holes 133*d* formed through this resistive block 133 in a vehicular transverse direction.

As shown in FIG. 16, the wire 134 for forming the energy absorbing section 128 together with the resistive block 133 is shaped by bending a metal wire having a circular section into two halves at a bent base portion 134*a*, engaging this bent base portion 134*a* with a hook portion 104*a* projectingly formed on the top surface of the front end of the upper jacket 104, drawing the two halves along the bottom surface of the resistive block 133, bending the two halves at the rear end of the resistive block 133, upwardly winding around the rear end portion of the resistive block 133 to be guided into the wire guides 133b, and guiding two end portions of the two halves onto the engaging guide portions 133c along both side surfaces of the rest of the resistive block 133 and the top surface of the distance bracket 114.

Since the operation shaft 120 of the locking mechanism 106 passes through the elongate holes 133d of the resistive block 133, the wire 134 results in an arrangement below and above the operation shaft 120.

Since the wire guide grooves 133b are inclined to have a generally V-shape, it becomes possible to make the wire guide grooves 133b have a curvature that is greater than that of a circular arc having a diameter that is equal to a distance between the distance bracket 114 and the jacket body 113 in a vertical direction in FIG. 15. With this, it becomes possible to set curvature of the wire guide grooves 133b that is necessary for the energy absorption without increasing the distance therebetween. Therefore, it becomes possible to make the distance bracket 114 compact in size.

In the impact energy absorbing mechanism 126, the contraction guide section 127 provides a sliding movement of the upper jacket 104 relative to the jacket body 113 of the middle jacket 103 at input of the impact load to allow a smooth contraction action therebetween, and the energy absorbing section 128 serves as a load generating section to gradually absorb the input load caused by the contraction action between the jacket body 113 and the upper jacket 104. Thus, these two sections of the impact energy absorbing mechanism 126 have two separate functions and arranged at two separate positions.

Therefore, when installed in a vehicle, the impact energy absorbing mechanism of the steering column apparatus of the present embodiment is maintained by itself to have a normal condition of FIGS. 11, 13 and 15. With this, it is capable of the steering operation by the steering wheel and of the tilt position adjustment and the telescopic position adjustment of the steering wheel.

At a secondary collision by the driver against the steering wheel in a vehicle collision, when a load of a predetermined amount or more is added to the upper jacket 104 through the steering wheel and the steering shaft 105 to compress the steering column, the shear pins 119 shown in FIG. 16 for fixing together the jacket body 113 of the middle jacket 103 and the upper jacket 104 are sheared, thereby allowing a sliding action of the upper jacket 104 relative to the jacket body 113 by the function of the contraction guide section 127 having the linear guide unit 131 as a main element.

In fact, there occurs a smooth sliding action between the jacket body 113 and the upper jacket 104 by the linear guide unit 131 to cause a smooth contraction action of them with a low frictional coefficient. As shown in FIGS. 16 and 17, stability of this contraction action is secured by that the balls 129b of each linear guide 129 forming the linear guide unit 131 roll along the guide grooves 132a, 132b of the jacket body 113 and the upper jacket 104. It is secured even if a load is added to the column jacket at a secondary collision to twist the column jacket.

At the contraction action between the jacket body 113 and the upper jacket 104, the energy absorbing section 128 having the resistive block 133 and the wire 134 as main elements functions simultaneously. That is, at the contraction action therebetween, as shown in FIG. 16, the wire 134, which is bent into two halves and engaged with the hook portion 104a of the upper jacket 104, is pulled in a forward direction of the vehicle. In this case, the wire 134 is gradually drawn, since the wire 134 is continuously subjected to a plastic deformation (bending) at the rear end portion of the resistive block 133.

More specifically, the wire 134 is continuously subjected to a plastic deformation at the rear end of the resistive block 133 to curl the wire 134 and then at the bottom of the resistive block 133 to restore the wire 134 to a straight form.

This plastic deformation of the wire 134 makes it possible to effectively and stably absorb impact energy at the secondary collision of the driver in a vehicle collision as originally designed, due to a smooth sliding action between the jacket body 113 and the upper jacket 104 by the linear guide unit 131. In other words, the sliding action therebetween does not affect the plastic deformation of the wire 134.

It is possible to adjust the impact energy absorption characteristic at the secondary collision by changing diameter of the wire 134, the groove width and thickness of the wire guide grooves 133b, and the curvature of the rear end portion of the resistive block 133, which is to be in a sliding contact with the wire 134 when it is drawn.

According to the energy absorbing section 128 of the impact energy absorbing mechanism 126 of the present embodiment, as shown in FIG. 16, the energy absorption is conducted by winding the wire 134 around the resistive block 133 fixed to the middle jacket having a polygonal rod shape and then drawing the wire 134 by the upper jacket 104, which has a similar polygonal rod shape and is subjected to a sliding movement relative to the middle jacket, for the energy absorption. Therefore, as compared with conventional techniques, a movable member is not twisted nor deformed during the energy absorption. Furthermore, it is possible to stably conduct energy absorption at the secondary collision even if the energy absorbing section 128 is formed to have a small occupied space. With this, the impact energy absorption characteristic becomes superior.

The wire 134 is engaged with the hook portion 104a positioned at the top of the front end of the upper jacket 104. Therefore, when the upper jacket 104 is moved forward along the axial direction, the moment of force acts on the upper jacket 104 in a direction to raise the front end of the upper jacket 104. This moment of force acts as a counterforce against the moment of force to raise the rear end of the upper jacket 104 by the secondary collision, thereby reducing twist of the upper jacket 104.

Furthermore, the middle jacket 103 is formed of the jacket body 113 having a polygonal rod shape and the inverse U-shaped distance bracket, and the energy absorbing section 128 formed of the resistive block 133 and the wire 134 is provided in an inner space of the distance bracket 114. With this, it is possible to make the steering column apparatus compact in size. Furthermore, it is possible to arrange the energy absorbing section 128 and the contraction guide section 127, which are distinct from each other in terms of function and position, in an overlapped condition in the axial direction of the middle jacket 103 and the upper jacket 104. With this, it is possible to make the steering column apparatus more compact in size.

The operation shaft 120 of the locking mechanism passes through the elongate hole 133d for the telescopic position adjustment formed through the resistive block 133, and the wire 134 is arranged to run above and below the operation shaft 120. Furthermore, the resistive block 133 is formed at its rear end portion with the guide grooves 133d for guiding the wire 134. Therefore, it is possible to suppress undesirable deformations of the wire 134 in the vertical and horizontal directions. With this, the energy absorption can be conducted more stably. This advantageous effect becomes more conspicuous when the engaging guide portions 133*c* for an engagement with the wire 134 are formed at the front end portion of the resistive block 133, as shown in FIG. 16.

As shown in FIG. 16, according to the present embodiment, the wire 134 in the form of a single wire is bent into two halves at the bent base portion 134*a*, is engaged with the upper jacket 104 at the bent base portion 134*a*, and is wound around the resistive block 133 by bending middle portions of the two halves. Therefore, the energy absorption can be conducted with a minimum necessary stroke by using the wire 134 with a minimum necessary length.

Both of the middle jacket 103 and the upper jacket 104 have a polygonal rod shape, and the middle jacket 103 with the upper jacket 104 inserted therein is supported in a box-shape structure formed of the inverse U-shaped attachment bracket 101 as an upper half and the U-shaped lower jacket 102 as a lower half. Thus, the steering column apparatus as a whole is high in stiffness (i.e., support stiffness and flexural stiffness) and is extremely superior in strength. This also contributes to stabilization of the energy absorption characteristic at the secondary collision.

In the above embodiment, both of the jacket body 113 of the middle jacket 103 and the upper jacket 104 have a rod shape and a tetragonal or deformed octagonal shape in transverse section. As long as they have a polygonal rod shape to be defined as being similar figures in transverse section, they may be, for example, one selected from regular hexagon, regular octagon, and polygons prepared by deforming these two, in transverse section.

The linear guides 129 as straight-movement guide members are not limited to those shown in FIG. 16 in terms of their number, type, etc. For example, the balls 129*b* as rolling elements of the linear guides 129 may be replaced by needles, rollers, etc. Furthermore, the installation positions of the linear guides 129 are not necessarily limited to those shown in FIG. 17, as long as they are positions at which a smooth relative sliding movement between the jacket body 113 of the middle jacket 103 and the upper jacket 104 can be achieved.

The entire contents of Japanese Patent Application Nos. 2015-208495 and 2016-72580 respectively filed on Oct. 23, 2015 and Mar. 31, 2016 are incorporated herein by reference.

What is claimed is:

1. A steering column apparatus, comprising:
   an inverse U-shaped attachment bracket to be fixed to a vehicle body;
   a U-shaped lower jacket that is arranged in an inside of the attachment bracket and is supported by the attachment bracket;
   a polygonal rod-shaped middle jacket that is arranged in an inside of the lower jacket and is supported by the lower jacket;
   an upper jacket that has a polygonal rod shape similar to that of the middle jacket and is slidably inserted and supported in the middle jacket; and
   an impact energy absorbing mechanism for absorbing an impact energy at a secondary collision,
   wherein the impact energy absorbing mechanism includes an energy absorbing section that serves as a load generating section for absorbing the impact energy,
   wherein the energy absorbing section includes (a) a resistive member that extends along an axial direction of the middle jacket and is fixed to the middle jacket and (b) a wire having a bent portion that is wound around the resistive member to have a curvature and a front portion that is fixed to the upper jacket, the front portion being at a more forward position than the bent portion.

2. The steering column apparatus as claimed in claim 1, wherein the impact energy absorbing mechanism is provided between the middle jacket and the upper jacket and absorbs the impact energy when the upper jacket is moved in the axial direction relative to the middle jacket,
   wherein the resistive member is a guide member having a center hole, first and second side holes arranged at both sides of the center hole, a first arcuate guide surface positioned between the center hole and the first side hole, and a second arcuate guide surface positioned between the center hole and the second side hole,
   wherein the impact energy absorbing mechanism further includes an engaging portion provided at the upper jacket,
   wherein the wire is plastically deformable, is engaged with the engaging portion and is generally W-shaped, thereby having an inverse U-shaped, center portion having first and second center legs extending from a base bent portion, a first side leg extending toward a first side of the base bent portion from a first curved bent portion connecting the first side leg and the first center leg with each other, and a second side leg extending toward a second side of the base bent portion from a second curved bent portion connecting the second side leg and the second center leg with each other,
   wherein the wire is engaged with the guide member such that the inverse U-shaped, center portion of the wire is received in the center hole of the guide member, that the first and second side legs of the wire are respectively received in the first and second side holes of the guide member, and that the first and second curved bent portions of the wire are respectively fitted onto the first and second arcuate guide surfaces of the guide member.

3. The steering column apparatus as claimed in claim 2, wherein the guide member is generally rectangular in shape in plan view, thereby having short and long sides,
   wherein the center hole and the first and second side holes are formed through the guide member in a direction along the short side of the guide member,
   wherein the guide member is fixed to the middle jacket by first and second screw members passing through open holes formed through the guide member in a direction along a thickness of the guide member.

4. The steering column apparatus as claimed in claim 3, wherein the middle jacket has a distance portion that is sandwiched between side wall portions of the attachment bracket,
   wherein a clamp shaft of a lock mechanism for locking and unlocking a tilt position of the steering column apparatus passes through the side wall portions of the attachment bracket and the distance portion,
   wherein the impact energy absorbing mechanism is arranged between the middle jacket and the clamp shaft of the lock mechanism,
   wherein the guide member is fixed to an outer surface of the middle jacket by the first and second screw members,
   wherein the engaging portion is provided at the upper jacket and is engaged with the base bent portion of the wire.

5. The steering column apparatus as claimed in claim 1, wherein the middle jacket includes a polygonal rod-shaped jacket body and an inverse U-shaped distance bracket that is fixed to an upper part of the jacket body, such that the energy absorbing section of the impact energy absorbing mechanism is received in a space defined in an inside of the distance bracket.

6. The steering column apparatus as claimed in claim 5, wherein there is provided a telescopic adjustment mechanism of the upper jacket relative to the middle jacket,
- wherein the attachment bracket is equipped with a locking mechanism having an operation shaft for locking and unlocking the telescopic adjustment mechanism,
- wherein the operation shaft of the locking mechanism passes through an elongate hole of the distance bracket and an elongate hole of the resistive member,
- wherein the wire has upper and lower portions respectively extending above and below the operation shaft,
- wherein the resistive member is formed at a rear end thereof with a guide groove for receiving therein the bent portion of the wire.

7. The steering column apparatus as claimed in claim 6, wherein the resistive member is formed at a front end portion thereof with an engaging guide portion to be engaged with a free end portion of the wire.

8. The steering column apparatus as claimed in claim 7, wherein the wire is folded at the front portion into two halves and is wound around the resistive member at the bent portion.

* * * * *